United States Patent
Andruszkiewicz et al.

(10) Patent No.: US 11,430,438 B2
(45) Date of Patent: Aug. 30, 2022

(54) ELECTRONIC DEVICE PROVIDING RESPONSE CORRESPONDING TO USER CONVERSATION STYLE AND EMOTION AND METHOD OF OPERATING SAME

(71) Applicant: SAMSUNG ELECTRONICS CO., LTD., Suwon-si (KR)

(72) Inventors: Piotr Andruszkiewicz, Plac Europejski (PL); Tomasz Latkowski, Plac Europejski (PL); Kamil Herba, Plac Europejski (PL); Maciej Pienkosz, Plac Europejski (PL); Iryna Orlova, Plac Europejski (PL); Jakub Staniszewski, Plac Europejski (PL); Krystian Koziel, Plac Europejski (PL)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 171 days.

(21) Appl. No.: 16/815,108

(22) Filed: Mar. 11, 2020

(65) Prior Publication Data
US 2020/0302927 A1 Sep. 24, 2020

(30) Foreign Application Priority Data
Mar. 22, 2019 (KR) .......................... 10-2019-0032836

(51) Int. Cl.
  *G10L 15/22* (2006.01)
  *G10L 15/30* (2013.01)
  (Continued)

(52) U.S. Cl.
  CPC .......... *G10L 15/22* (2013.01); *G10L 15/1815* (2013.01); *G10L 15/24* (2013.01);
  (Continued)

(58) Field of Classification Search
  USPC .................................................. 704/231–275
  See application file for complete search history.

(56) References Cited

U.S. PATENT DOCUMENTS

| 6,374,224 B1 | 4/2002 | Horiguchi et al. |
| 7,912,720 B1 | 3/2011 | Hakkani-Tur et al. |
| (Continued) | | |

FOREIGN PATENT DOCUMENTS

| JP | 2017-215468 A | 12/2017 |
| KR | 10-0463706 B1 | 12/2004 |
| (Continued) | | |

OTHER PUBLICATIONS

International Search Report (PCT/ISA/210) dated Jun. 5, 2020 issued by the International Searching Authority in International Application No. PCT/KR2020/003757.
(Continued)

*Primary Examiner* — Jesse S Pullias
(74) *Attorney, Agent, or Firm* — Sughrue Mion, PLLC

(57) ABSTRACT

An electronic device includes a microphone, a communication circuit, and a processor configured to obtain a user's utterance through the microphone, transmit first information about the utterance through the communication circuit to an external server for at least partially automatic speech recognition (ASR) or natural language understanding (NLU), obtain a second text from the external server through the communication circuit, the second text being a text resulting from modifying at least part of a first text included in a neutral response to the utterance based on parameters corresponding to the user's conversation style and emotion identified based on the first information, and provide a voice corresponding to the second text or a message including the second text in response to the utterance.

19 Claims, 24 Drawing Sheets

(51) Int. Cl.
  *G10L 25/63* (2013.01)
  *G10L 15/24* (2013.01)
  *G10L 15/18* (2013.01)

(52) U.S. Cl.
  CPC .............. *G10L 15/30* (2013.01); *G10L 25/63* (2013.01); *G10L 2015/223* (2013.01); *G10L 2015/226* (2013.01)

(56) References Cited

U.S. PATENT DOCUMENTS

| | | | |
|---|---|---|---|
| 9,721,005 | B2 | 8/2017 | Byron et al. |
| 2003/0040911 | A1* | 2/2003 | Oudeyer .................. G10L 13/10 704/266 |
| 2006/0069728 | A1 | 3/2006 | McEvilly et al. |
| 2006/0122834 | A1* | 6/2006 | Bennett .................. G10L 15/30 704/256 |
| 2007/0271098 | A1* | 11/2007 | Stewart .................. G10L 25/63 704/257 |
| 2009/0299932 | A1 | 12/2009 | Hodge et al. |
| 2014/0163983 | A1* | 6/2014 | Kim ........................ G10L 15/26 704/235 |
| 2015/0012463 | A1 | 1/2015 | Rosenthal |
| 2016/0210985 | A1 | 7/2016 | Deleeuw |
| 2017/0345424 | A1 | 11/2017 | Ikeno et al. |
| 2018/0285752 | A1 | 10/2018 | Yu et al. |
| 2019/0164551 | A1* | 5/2019 | Watanabe ............... G10L 15/22 |

FOREIGN PATENT DOCUMENTS

| | | |
|---|---|---|
| KR | 10-2014-0126485 A | 10/2014 |
| KR | 10-2015-0045177 A | 4/2015 |
| KR | 10-2017-0092603 A | 8/2017 |
| WO | 2016164417 A1 | 10/2016 |

OTHER PUBLICATIONS

Written Opinion (PCT/ISA/237) dated Jun. 5, 2020 issued by the International Searching Authority in International Application No. PCT/KR2020/003757.
Ashish Vaswani et al. "Attention is All You Need" 31st Conference on Neural Information Processing Systems, 2017, (15 pages total).

* cited by examiner

| | EMOTION<br>CONVERSATION STYLE | HAPPY | CRANKY |
|---|---|---|---|
| FRIEND | | X1 | X2 |
| TEENAGER | | Y1 | Y2 |
FIG.19B
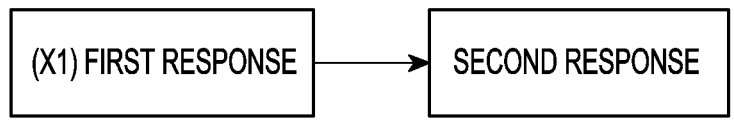
FIG.19C
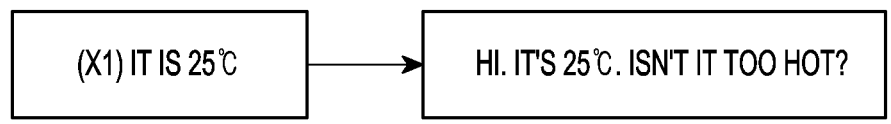
FIG.19D

ELECTRONIC DEVICE PROVIDING RESPONSE CORRESPONDING TO USER CONVERSATION STYLE AND EMOTION AND METHOD OF OPERATING SAME

CROSS-REFERENCE TO RELATED APPLICATION(S)

This application is based on and claims priority under 35 U.S.C. 119 to Korean Patent Application No. 10-2019-0032836, filed on Mar. 22, 2019, in the Korean Intellectual Property Office, the disclosure of which is herein incorporated by reference in its entirety.

BACKGROUND

Technical Field

Various embodiments relate to artificial intelligence (AI) systems mimicking the functions of the human brain, such as perception or decision-making, using a machine learning (e.g., deep learning) algorithm and applications thereof.

Description of Related Art

Artificial intelligence systems are computer systems capable of implementing human-like intelligence, which allow machines to self-learn, make decisions, and provide better recognition as they are used more and more.

Artificial intelligence technology may include element techniques such as machine learning (deep learning) which utilizes algorithms capable of classifying and learning the features of entered data and then copying the perception or determination by a human brain using the machine learning algorithms.

Such element techniques may include linguistic understanding which recognizes human languages/words, visual understanding which recognizes things as humans visually do, inference/prediction which determines information and performs logical inference and prediction, knowledge expression which processes human experience information as knowledge data, and motion control which controls robot motions and driverless vehicles.

Linguistic understanding is technology for recognizing and applying/processing human language or text, and encompasses natural language processing, machine translation, a dialog system, answering inquiries, and speech recognition/synthesis.

Visual understanding is a technique of perceiving and processing things as human eyes do, and encompasses object recognition, object tracing, image search, human recognition, scene recognition, space understanding, and image enhancement.

Inference prediction is a technique of determining and logically inferring and predicting information, encompassing knowledge/probability-based inference, optimization prediction, preference-based planning, and recommendation.

Knowledge expression is a technique of automatically processing human experience information, covering knowledge buildup (data production/classification) and knowledge management (data utilization).

Operation control is a technique of controlling the motion of robots and driverless car driving, and this encompasses movement control (e.g., navigation, collision, driving) and maneuvering control (behavior control).

Voice-recognizable electronic devices may provide a response containing neutral text in response to the user's utterance. However, the neutral text cannot reflect, e.g., the user's emotion, style, and context, and it may thus be taken as a mechanical response by the user. In other words, conventional voice-recognizable electronic devices cannot provide an adequate response to the user's context considering the user's style or emotion.

The above information is presented as background information only to assist with an understanding of the disclosure. No determination has been made, and no assertion is made, as to whether any of the above might be applicable as prior art with regard to the disclosure.

SUMMARY

According to various embodiments, there may be provided an electronic device to provide a response containing text appropriate for the user's context considering the user's style and emotion in response to the user's utterance and a method of operating the electronic device.

According to an embodiment, an electronic device comprises a microphone, a communication circuit, and a processor configured to obtain a user's utterance through the microphone, transmit first information about the utterance through the communication circuit to an external server for at least partially automatic speech recognition (ASR) or natural language understanding (NLU), obtain a second text from the external server through the communication circuit, the second text being a text resulting from modifying at least part of a first text included in a neutral response to the utterance based on parameters corresponding to the user's conversation style and emotion identified based on the first information, and provide a voice corresponding to the second text or a message including the second text in response to the utterance.

According to an embodiment, a method for operating an electronic device comprises obtaining a user's utterance through a microphone of the electronic device, transmitting first information about the utterance through a communication circuit of the electronic device to an external server for at least partially ASR or NLU, obtaining a second text from the external server through the communication circuit, the second text being a text resulting from modifying at least part of a first text included in a neutral response to the utterance based on parameters corresponding to the user's conversation style and emotion identified based on the first information, and providing a voice corresponding to the second text and/or a message including the second text in response to the utterance.

According to an embodiment, an electronic device comprises a microphone and a processor configured to obtain a user's utterance through the microphone, obtain a neutral first response to the utterance by at least partially performing ASR or NLU, identify information about the user's conversation style and emotion based on the utterance, obtain a second response including a second text resulting from modifying at least part of a first text included in the first response based on the identified information, and provide the second response through a voice or a message in response to the utterance.

According to an embodiment, a device comprises a communication circuit and a processor configured to receive first information about a user's utterance from an electronic device through the communication circuit, obtain a neutral first response based on the first information, identify the user's conversation style and emotion based on the first information, change at least part of a text contained in the first response or add a new text to the text contained in the first response based on the user's conversation style and emotion, obtain a second response corresponding to the first response based on the changed or added text, and transmit the second response to the electronic device through the communication circuit.

Other aspects, advantages, and salient features of the disclosure will become apparent to those skilled in the art from the following detailed description, which, taken in conjunction with the annexed drawings, discloses exemplary embodiments of the disclosure.

BRIEF DESCRIPTION OF THE DRAWINGS

A more complete appreciation of the disclosure and many of the attendant aspects thereof will be readily obtained as the same becomes better understood by reference to the following detailed description when considered in connection with the accompanying drawings, wherein:

FIGS. 19A, 19B, 19C, and 19D are views illustrating an operation of generating a response to a user's utterance by a server according to an embodiment;

Throughout the drawings, like reference numerals will be understood to refer to like parts, components, and structures.

DETAILED DESCRIPTION

Before describing various embodiments of the disclosure, an integrated intelligence system to which an embodiment of the disclosure may apply is described.

Figure 1:
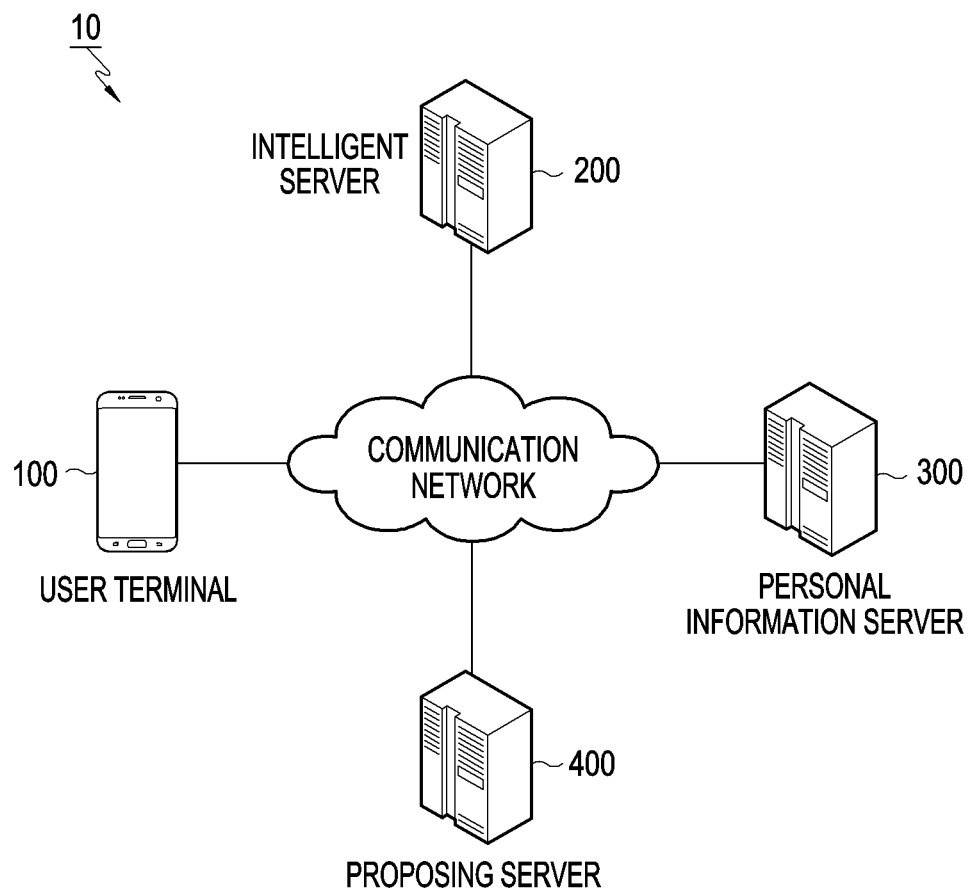
FIG. 1 is a view illustrating an integrated intelligence system according to an embodiment of the disclosure.

FIG. 1 is a view illustrating an integrated intelligence system according to an embodiment of the disclosure.

Referring to FIG. 1, an integrated intelligence system 10 may include a user terminal 100, an intelligent server 200, a personal information server 300, or a proposing server 400.

The user terminal 100 may provide services necessary for the user through an application (or application program) (e.g., an alarm application, message application, photo (Gallery) application, etc.) stored in the user terminal 100. For example, the user terminal 100 may execute and operate another application through an intelligent application (or speech recognition application) stored in the user terminal 100. The intelligent application of the user terminal 100 may receive user inputs to execute and operate the other application through the intelligent application. The user inputs may be received through, e.g., a physical button, touchpad, voice input, or remote input. According to an embodiment of the disclosure, the user terminal 100 may be various terminal devices (or electronic devices) connectable to the internet, such as a cellular phone, smartphone, personal digital assistant (PDA), or laptop computer.

According to an embodiment of the disclosure, the user terminal 100 may receive a user utterance as a user input. The user terminal 100 may receive the user utterance and generate a command to operate the application based on the user utterance. Accordingly, the user terminal 100 may operate the application using the command.

The intelligent server 200 may receive the user's voice input from the user terminal 100 through a communication network and convert the voice input into text data. According to an embodiment of the disclosure, the intelligent server 200 may generate or select a path rule based on the text data. The path rule may include information about actions or operations to perform the functions of the application or information about parameters necessary to execute the operations. Further, the path rule may include the order of the operations of the application. The user terminal 100 may receive the path rule, select an application according to the path rule, and execute the operations included in the path rule on the selected application.

For example, the user terminal 100 may execute the operation and display, on the display, the screen corresponding to the state of the user terminal 100 having performed the operation. As another example, the user terminal 100 may execute the operation and abstain from displaying the results of performing the operation on the display. The user terminal 100 may execute, e.g., a plurality of operations and display, on the display, only some results of the plurality of operations. The user terminal 100 may display, on the display, e.g., the results of executing only the last operation in order. As another example, the user terminal 100 may receive a user input and display the results of executing the operation on the display.

The personal information server 300 may include a database storing user information. For example, the personal information server 300 may receive user information (e.g., context information or application execution) from the user terminal 100 and store the user information in the database. The intelligent server 200 may receive the user information from the personal information server 300 through the communication network and use the same in creating a path rule for user inputs. According to an embodiment of the disclosure, the user terminal 100 may receive user information from the personal information server 300 through the communication network and use the same as information for managing the database.

The proposing server 400 may include a database that stores information about functions to be provided or introductions of applications or functions in the terminal. For example, the proposing server 400 may receive user information of the user terminal 100 from the personal information server 300 and include a database for functions that the user may utilize. The user terminal 100 may receive the information about functions to be provided from the proposing server 400 through the communication network and provide the information to the user.

Figure 2:
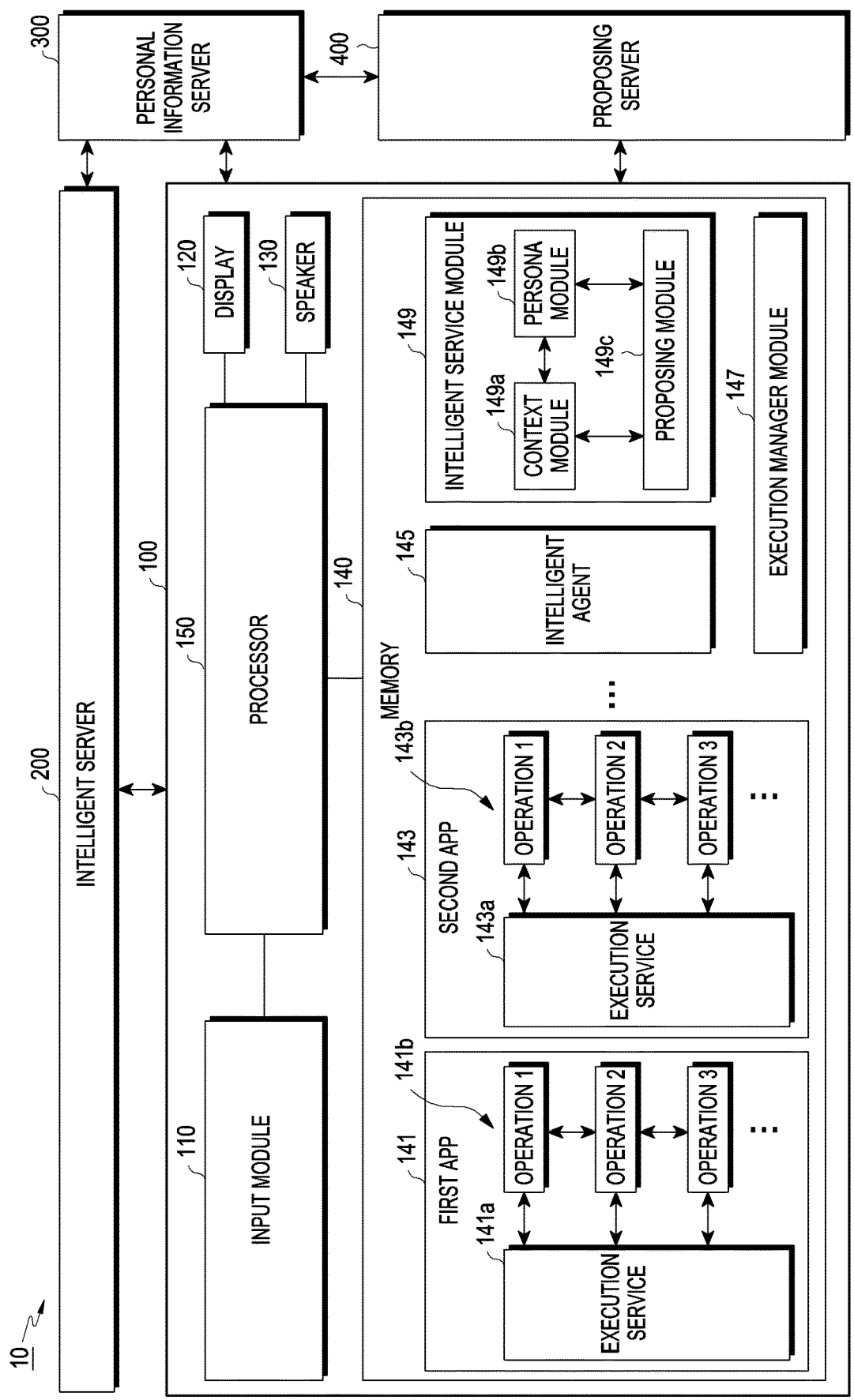
FIG. 2 is a block diagram illustrating a user terminal in an integrated intelligence system according to an embodiment of the disclosure.

FIG. 2 is a block diagram illustrating a user terminal in an integrated intelligence system according to an embodiment of the disclosure.

Referring to FIG. 2, the user terminal 100 may include an input module 110, a display 120, a speaker 130, a memory 140, and a processor 150. The user terminal 100 may further include a housing. The components of the user terminal 100 may be positioned in or on the housing.

According to an embodiment of the disclosure, the input module 110 may receive user inputs from the user. For example, the input module 110 may receive a user input from an external device (e.g., a keyboard or headset) connected thereto. As another example, the input module 110 may include a touchscreen combined with the display 120 (e.g., a touchscreen display). As another example, the input module 110 may include a hardware key or a physical key positioned in the user terminal 100 or the housing of the user terminal 100.

According to an embodiment of the disclosure, the input module 110 may include a microphone 111 capable of receiving user utterances as voice signals. For example, the input module 110 may include a speech input system and receive user utterances as voice signals through the speech input system.

According to an embodiment of the disclosure, the display 120 may display images, videos, and/or application execution screens. For example, the display 120 may display a graphic user interface (GUI) of an application.

According to an embodiment of the disclosure, the speaker 130 may output voice signals. For example, the speaker 130 may output voice signals generated from inside the user terminal 100 to the outside.

According to an embodiment of the disclosure, the memory 140 may store a plurality of applications 141 and 143. The plurality of applications 141 and 143 stored in the memory 140 may be selected, executed, and operated according to the user's inputs.

According to an embodiment of the disclosure, the memory 140 may include a database that may store information necessary to recognize user inputs. For example, the memory 140 may include a log database capable of storing log information. As another example, the memory' 140 may include a persona database capable of storing user information.

According to an embodiment of the disclosure, the memory 140 may store the plurality of applications 141 and 143. The plurality of applications 141 and 143 may be loaded and operated. For example, the plurality of applications 141 and 143 stored in the memory 140 may be loaded and operated by the execution manager module 147 of the processor 150. The plurality of applications 141 and 143 may include execution services 141*a* and 143*a* or a plurality of operations or unit operations 141*b* and 143*b* performing functions. The execution services 141*a* and 143*a* may be generated by the execution manager module 147 of the processor 150 and may execute the plurality of operations 141*b* and 143*b*.

According to an embodiment of the disclosure, when the operations 141*b* and 143*b* of the applications 141 and 143 are executed, the execution state screens as per the execution of the operations 141*b* and 143*b* may be displayed on the display 120. The execution state screens may display that operations 141*b* and 143*b* have been completed. The execution state screens may display that operations 141*b* and 143*b* have been stopped (partial landing) (e.g., where parameters required for the operations 141*b* and 143*b* are not inputted).

According to an embodiment of the disclosure, the execution services 141*a* and 143*a* may execute the operations 141*b* and 143*b* as per a path rule. For example, the execution services 141*a* and 143*a* may be generated by the execution manager module 147, receive an execution request as per the path rule from the execution manager module 147, and execute the operations 141*b* and 143*b* of applications 141 and 143 according to the execution request. When the execution of the operations 141*b* and 143*b* is complete, the execution services 141*a* and 143*a* may send completion information to the execution manager module 147.

According to an embodiment of the disclosure, where the plurality of operations 141*b* and 143*b* are executed on the applications 141 and 143, the plurality of operations 141*b* and 143*b* may sequentially be executed. When the execution of one operation (operation 1) is complete, the execution services 141*a* and 143*a* may open the next operation (operation 2) and send completion information to the execution manager module 147. Here, 'open an operation' may be appreciated as transitioning the operation into an executable state or preparing for the execution of the operation. In other words, unless the operation is open, the operation cannot be executed. Upon receiving the completion information, the execution manager module 147 may send execution requests for the next operations 141*b* and 143*b* to the execution service (e.g., operation 2). According to an embodiment of the disclosure, where the plurality of applications 141 and 143 are executed, the plurality of applications 141 and 143 may sequentially be executed. For example, when the execution of the last operation of the first application 141 is complete, and completion information is thus sent, the execution manager module 147 may send an execution request for the first operation of the second application 143 to the execution service 143a.

According to an embodiment of the disclosure, where the plurality of operations 141b and 143b are executed on the applications 141 and 143, the resultant screens of execution of the plurality of operations 141b and 143b may be displayed on the display 120. According to an embodiment of the disclosure, only some of the plurality of resultant screens of execution of the plurality of operations 141b and 143b may be displayed on the display 120.

According to an embodiment of the disclosure, the memory 140 may store an intelligent application (e.g., a speech recognition application) interworking with the intelligent agent 145. The application interworking with the intelligent agent 145 may receive a user utterance as a voice signal and process the same. According to an embodiment of the disclosure, the application interworking with the intelligent agent 145 may be operated by particular inputs entered through the input module 110 (e.g., inputs through the hardware key or touchscreen, or particular voice inputs).

According to an embodiment of the disclosure, the processor 150 may control the overall operation of the user terminal 100. For example, the processor 150 may control the input module 110 to receive user inputs. The processor 150 may control the display 120 to display images. The processor 150 may control the speaker 130 to output voice signals. The processor 150 may control the memory 140 to fetch or store necessary information.

According to an embodiment of the disclosure, the processor 150 may include the intelligent agent 145, the execution manager module 147, or the intelligent service module 149. According to an embodiment of the disclosure, the processor 150 may execute commands stored in the memory 140 to drive the intelligent agent 145, the execution manager module 147, or the intelligent service module 149. Several modules mentioned according to various embodiments of the disclosure may be implemented in hardware or software. According to an embodiment of the disclosure, operations performed by the intelligent agent 145, the execution manager module 147, or the intelligent service module 149 may be appreciated as operations performed by the processor 150.

According to an embodiment of the disclosure, the intelligent agent 145 may generate commands to operate applications based on voice signals received as user inputs. According to an embodiment of the disclosure, the execution manager module 147 may receive commands generated by the intelligent agent 145 to select, execute, and operate the applications 141 and 143 stored in the memory 140. According to an embodiment of the disclosure, the intelligent service module 149 may be used to manage user information to process user inputs.

The intelligent agent 145 may send user inputs received through the input module 110 to the intelligent server 200 for processing.

According to an embodiment of the disclosure, the intelligent agent 145 may pre-process the user inputs before sending the user inputs to the intelligent server 200. According to an embodiment of the disclosure, the intelligent agent 145 may include an adaptive echo canceller (AEC) module, a noise suppression (NS) module, an end-point detection (EPD) module, or an automatic gain control (AGC) module to pre-process the user inputs. The AEC module may remove echoes mixed in the user inputs. The NS module may suppress background noise mixed in the user inputs. The EPD module may detect end points of user voices contained in the user inputs to find where the user voices are present. The AGC module may recognize the user inputs and adjust the volume of the user inputs to be properly processed. According to an embodiment of the disclosure, the intelligent agent 145 may include all of the pre-processing components described above to provide a better performance, the intelligent agent 145 may alternatively include only some of the pre-processing components to be operated at reduced power.

According to an embodiment of the disclosure, the intelligent agent 145 may include a wake-up recognition module to recognize the user's invocation. The wake-up recognition module may recognize the user's wake-up command through the speech recognition module, and upon receiving the wake-up command, the wake-up recognition module may activate the intelligent agent 145 to receive user inputs. According to an embodiment of the disclosure, the wake-up recognition module of the intelligent agent 145 may be implemented in a low-power processor (e.g., a processor included in an audio codec). According to an embodiment of the disclosure, the intelligent agent 145 may be activated by a user input through the hardware key. Where the intelligent agent 145 is activated, an intelligent application (e.g., a speech recognition application) interworking with the intelligent agent 145 may be executed.

According to an embodiment of the disclosure, the intelligent agent 145 may include a speech recognition module to execute user inputs. The speech recognition module may receive user inputs to execute operations on the application. For example, the speech recognition module may recognize limited user (voice) inputs (e.g., the "Click" sound made when the capturing operation is executed on the camera application) for executing operations, such as the wake-up command on the applications 141 and 143. The speech recognition module assisting the intelligent server 200 in recognizing user inputs may recognize user commands processable in, e.g., the user terminal 100 and quickly process the user commands.

According to an embodiment of the disclosure, the speech recognition module to execute user inputs of the intelligent agent 145 may be implemented in an application processor.

According to an embodiment of the disclosure, the speech recognition module, including the wake-up recognition module, of the intelligent agent 145 may recognize user inputs using an algorithm for recognizing voice. The algorithm used to recognize voice may be at least one of, e.g., a hidden markov model (HMM) algorithm, an artificial neural network (ANN) algorithm, or a dynamic time warping (DTW) algorithm.

According to an embodiment of the disclosure, the intelligent agent 145 may convert the user's voice inputs into text data. According to an embodiment of the disclosure, the intelligent agent 145 may deliver the user's voice to the intelligent server 200 and receive text data converted. Accordingly, the intelligent agent 145 may display the text data on the display 120.

According to an embodiment of the disclosure, the intelligent agent 145 may receive a path rule from the intelligent server 200. According to an embodiment of the disclosure, the intelligent agent 145 may send the path rule to the execution manager module 147.

According to an embodiment of the disclosure, the intelligent agent 145 may send an execution result log as per the path rule received from the intelligent server 200 to the intelligent service module 149. The execution result log sent may be accrued and managed in user preference information of a persona manager 149b.

According to an embodiment of the disclosure, the execution manager module 147 may receive the path rule from the intelligent agent 145, execute the applications 141 and 143, and allow the applications 141 and 143 to perform the operations 141b and 143b contained in the path rule. For example, the execution manager module 147 may send command information to execute the operations 141b and 143b to the applications 141 and 143 and receive completion information about the operations 141b and 143b from the applications 141 and 143.

According to an embodiment of the disclosure, the execution manager module 147 may send or receive command information to execute the operations 141b and 143b of the applications 141 and 143 between the intelligent agent 145 and the applications 141 and 143. The execution manager module 147 may bind the applications 141 and 143 to be executed as per the path rule and send the command information about the operations 141b and 143b contained in the path rule to the applications 141 and 143. For example, the execution manager module 147 may sequentially send the operations 141b and 143b contained in the path rule to the applications 141 and 143 and sequentially execute the operations 141b and 143b of the applications 141 and 143 as per the path rule.

According to an embodiment of the disclosure, the execution manager module 147 may manage the execution states of the operations 141b and 143b of the applications 141 and 143. For example, the execution manager module 147 may receive information about the execution states of the operations 141b and 143b from the applications 141 and 143. Where the execution states of the operations 141b and 143b are, e.g., partial landing states (e.g., when no parameters required for the operations 141b and 143b are entered yet), the execution manager module 147 may send information about the partial landing states to the intelligent agent 145. The intelligent agent 145 may request the user to enter necessary information (e.g., parameter information) using the received information. Where the execution states of the operations 141b and 143b are, e.g., operation states, utterances may be received from the user, and the execution manager module 147 may send information about the applications 141 and 143 being executed and information about the execution states to the intelligent agent 145. The intelligent agent 145 may receive parameter information about the user utterance through the intelligent server 200 and send the received parameter information to the execution manager module 147. The execution manager module 147 may change the parameters of the operations 141b and 143b into new parameters using the received parameter information.

According to an embodiment of the disclosure, the execution manager module 147 may deliver the parameter information contained in the path rule to the applications 141 and 143. Where the plurality of applications 141 and 143 are sequentially executed as per the path rule, the execution manager module 147 may deliver the parameter information contained in the path rule from one application to the other.

According to an embodiment of the disclosure, the execution manager module 147 may receive a plurality of path rules. The execution manager module 147 may select a plurality of path rules based on a user utterance. For example, where a user utterance specifies a certain application 141 to execute some operation 141b but does not specify another application 143 to execute the other operation 143b, the execution manager module 147 may receive a plurality of different path rules by which the same application 141 (e.g., Gallery application) to execute the operation 141b is executed and a different application 143 (e.g., message application or telegram application) to execute the other operation 143b is executed. The execution manager module 147 may execute the same operations 141b and 143b (e.g., the same continuous operations 141b and 143b) of the plurality of path rules. Where the same operations have been executed, the execution manager module 147 may display, on the display 120, the state screen where the different applications 141 and 143 each contained in a respective one of the plurality of path rules may be selected.

According to an embodiment of the disclosure, the intelligent service module 149 may include a context module 149a, a persona manager 149b, or a proposing module 149c.

The context module 149a may gather current states of the applications 141 and 143 from the applications 141 and 143. For example, the context module 149a may receive context information indicating the current states of the applications 141 and 143 to gather the current states of the applications 141 and 143.

The persona manager 149b may manage personal information of the user who uses the user terminal 100. For example, the persona manager 149b may gather use information and execution results for the user terminal 100 to manage the user's personal information.

The proposing module 149c may predict the user's intent and recommend commands to the user. For example, the proposing module 149c may recommend commands to the user given the user's current state (e.g., time, place, context, or application).

Figure 3:
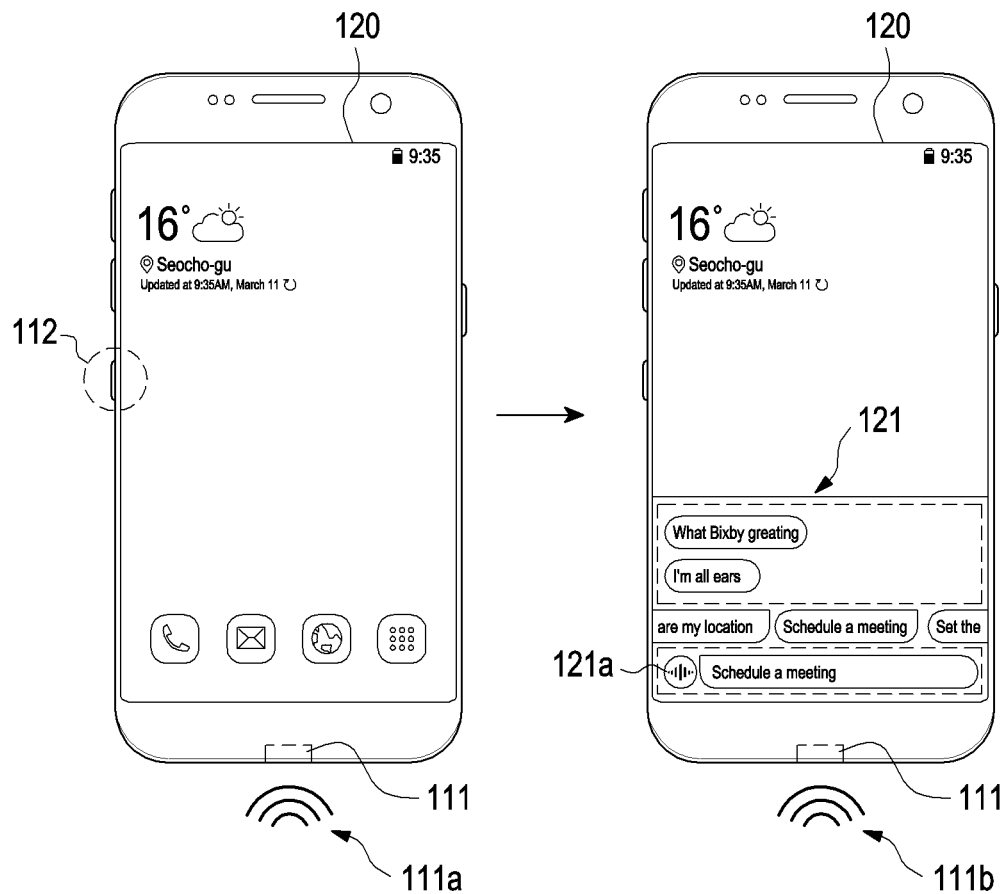
FIG. 3 is a view illustrating an example of executing an intelligent application on a user terminal according to an embodiment of the disclosure.

FIG. 3 is a view illustrating an example of executing an intelligent application on a user terminal according to an embodiment of the disclosure.

FIG. 3 illustrates an example in which the user terminal 100 receives user inputs and executes an intelligent application (e.g., a speech recognition application) interworking with the intelligent agent 145.

According to an embodiment of the disclosure, the user terminal 100 may execute an intelligent application to recognize voice through the hardware key 112. For example, where the user terminal 100 receives user inputs through the hardware key 112, the user terminal 100 may display a user interface (UI) 121 of the intelligent application on the display 120. The user may touch a speech recognition button 121a in the UI 121 of the intelligent application for voice entry 111b with the intelligent application UI 121 displayed on the display 120. The user may continuously press the hardware key 112 for voice entry 111b.

According to an embodiment of the disclosure, the user terminal 100 may execute an intelligent application to recognize voice through the microphone 111. For example, where a designated voice input (e.g., "wake up!") is entered 111a through the microphone 111, the user terminal 100 may display 120 the intelligent application UI 121 on the display 120.

Figure 4:
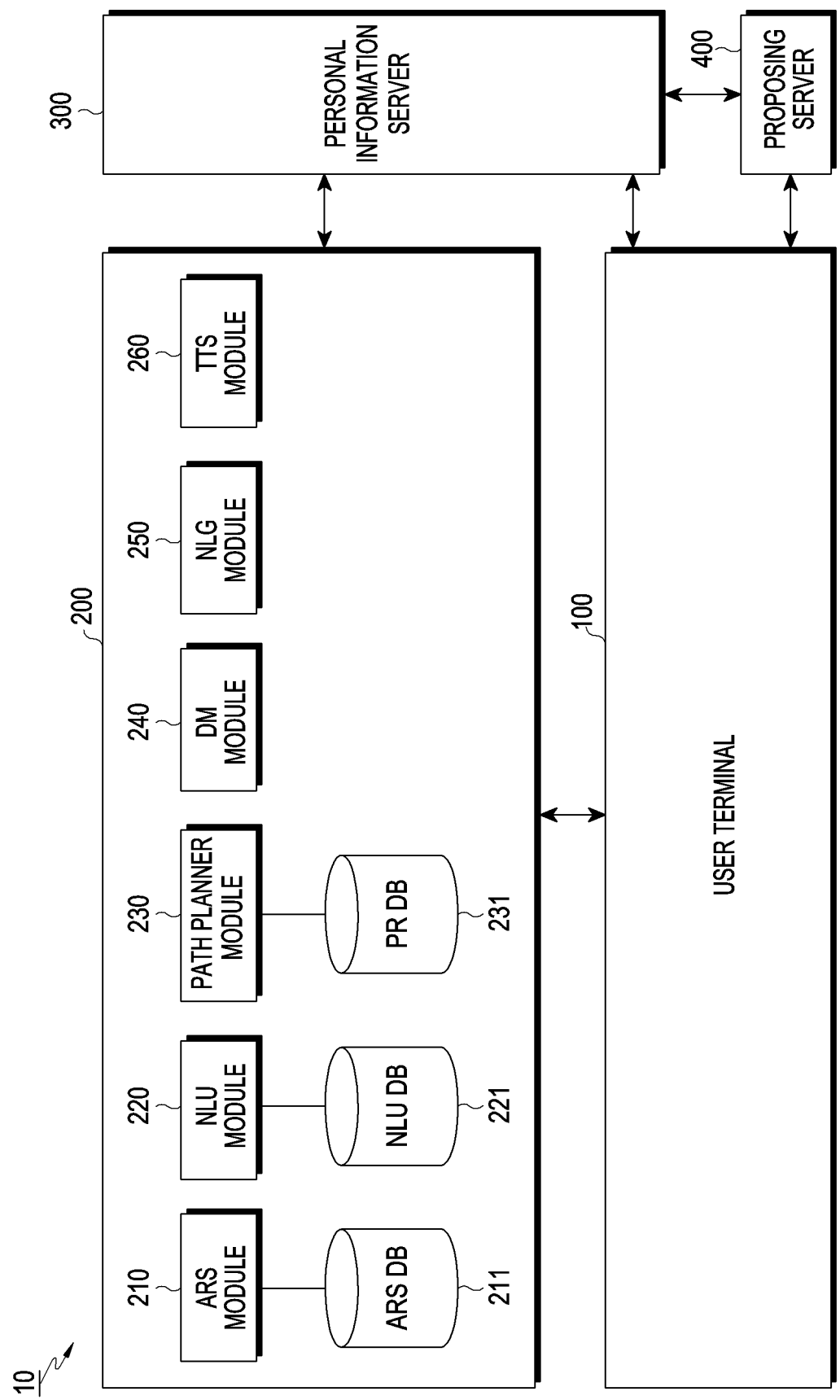
FIG. 4 is a block diagram illustrating an intelligent server in an integrated intelligence system according to an embodiment of the disclosure.

FIG. 4 is a block diagram illustrating an intelligent server in an integrated intelligence system according to an embodiment of the disclosure.

Referring to FIG. 4, an intelligent server 200 may include an automatic speech recognition (ASR) module 210, a natural language understanding (NLU) module 220, a path planner module 230, a dialogue manager (DM) module 240, a natural language generator (NLG) module 250, or a text-to-speech (TTS) module 260.

The NLU module 220 or the path planner module 230 of the intelligent server 200 may generate a path rule.

According to an embodiment of the disclosure, the ASR module 210 may convert user inputs received from the user terminal 100 into text data.

According to an embodiment of the disclosure, the ASR module 210 may convert user inputs received from the user terminal 100 into text data. For example, the ASR module 210 may include a speech recognition module. The speech recognition module may include an acoustic model and a language model. For example, the acoustic model may include vocalization-related information, and the language model may include unit phonemic information and combinations of pieces of unit phonemic information. The speech recognition module may convert user utterances into text data using the vocalization-related information and unit phonemic information. Information about the acoustic model and the language model may be stored in, e.g., an automatic speech recognition (ASR) database (DB) 211.

According to an embodiment of the disclosure, the NLU module 220 may perform syntactic analysis or semantic analysis to grasp the user's intent. As per the syntactic analysis, the user input may be divided into syntactic units (e.g., words, phrases, or morphemes) and what syntactic elements the syntactic units have may be grasped. The semantic analysis may be performed using, e.g., semantic matching, rule matching, or formula matching. Thus, the NLU module 220 may obtain a domain, intent, or parameters (or slots) necessary to represent the intent for the user input.

According to an embodiment of the disclosure, the NLU module 220 may determine the user's intent and parameters using the matching rule which has been divided into the domain, intent, and parameters or slots necessary to grasp the intent. For example, one domain (e.g., an alarm) may include a plurality of intents (e.g., setting or turning off an alarm), and one intent may include a plurality of parameters (e.g., time, repetition count, or alarm sound). The plurality of rules may include, e.g., one or more essential element parameters. The matching rule may be stored in a natural language understanding (NLU) database (DB) 221.

According to an embodiment of the disclosure, the NLU module 220 may grasp the meaning of a word extracted from the user input using linguistic features (e.g., syntactic elements) such as morphemes or phrases, match the grasped meaning of the word to the domain and intent, and determine the user's intent. For example, the NLU module 220 may calculate how many words extracted from the user input are included in each domain and intent to thereby determine the user's intent. According to an embodiment of the disclosure, the NLU module 220 may determine the parameters of the user input using the word which is a basis for grasping the intent. According to an embodiment of the disclosure, the NLU module 220 may determine the user's intent using the NLU DB 221 storing the linguistic features for grasping the intent of the user input. According to an embodiment of the disclosure, the NLU module 220 may determine the user's intent using a personal language model (PLM). For example, the NLU module 220 may determine the user's intent using personal information (e.g., contacts list or music list). The PLM may be stored in, e.g., the NLU DB 221. According to an embodiment of the disclosure, the ASR module 210, but not the NLU module 220 alone, may recognize the user's voice by referring to the PLM stored in the NLU DB 221.

According to an embodiment of the disclosure, the NLU module 220 may generate a path rule based on the intent of the user input and parameters. For example, the NLU module 220 may select an application to be executed based on the intent of the user input and determine operations to be performed on the selected application. The NLU module 220 may determine parameters corresponding to the determined operations to generate a path rule. According to an embodiment of the disclosure, the path rule generated by the NLU module 220 may include information about the application to be executed, the operations to be executed on the application, and the parameters necessary to execute the operations.

According to an embodiment of the disclosure, the NLU module 220 may generate one or more path rules based on the parameters and intent of the user input. For example, the NLU module 220 may receive a path rule set corresponding to the user terminal 100 from the path planner module 230, map the parameters and intent of the user input to the received path rule set, and determine the path rule.

According to an embodiment of the disclosure, the NLU module 220 may determine the application to be executed, operations to be executed on the application, and parameters necessary to execute the operations based on the parameters and intent of the user input, thereby generating one or more path rules. For example, the NLU module 220 may generate a path rule by arranging the application to be executed and the operations to be executed on the application in the form of ontology or a graph model according to the user input using the information of the user terminal 100. The generated path rule may be stored through, e.g., the path planner module 230 in a path rule database (PR DB) 231. The generated path rule may be added to the path rule set of the database 231.

According to an embodiment of the disclosure, the NLU module 220 may select at least one of a plurality of path rules generated. For example, the NLU module 220 may select the optimal one of the plurality of path rules. As another example, the NLU module 220 may select a plurality of path rules when only some operations are specified based on the user utterance. The NLU module 220 may determine one of the plurality of path rules by the user's additional input.

According to an embodiment of the disclosure, the NLU module 220 may send the path rule to the user terminal 100 at a request for the user input. For example, the NLU module 220 may send one path rule corresponding to the user input to the user terminal 100. As another example, the NLU module 220 may send a plurality of path rules corresponding to the user input to the user terminal 100. For example, where only some operations are specified based on the user utterance, the plurality of path rules may be generated by the NLU module 220.

According to an embodiment of the disclosure, the path planner module 230 may select at least one of the plurality of path rules.

According to an embodiment of the disclosure, the path planner module 230 may deliver a path rule set including the plurality of path rules to the NLU module 220. The plurality of path rules in the path rule set may be stored in the form of a table in the path rule database 231 connected with the path planner module 230. For example, the path planner module 230 may deliver to the NLU module 220 a path rule set corresponding to information (e.g., OS information or application information) of the user terminal 100 which is received from the intelligent agent 145. The table may be stored by domain or domain version in the path rule database 231.

According to an embodiment of the disclosure, the path planner module 230 may select one or more path rules from the path rule set and deliver the same to the NLU module 220. For example, the path planner module 230 may match the user's intent and parameters to the path rule set corresponding to the user terminal 100 to select one or more path rules and deliver them to the NLU module 220.

According to an embodiment of the disclosure, the path planner module 230 may generate one or more path rules using the user's intent and parameters. For example, the path planner module 230 may determine an application to be executed and operations to be executed on the application based on the user's intent and parameters to generate one or more path rules. According to an embodiment of the disclosure, the path planner module 230 may store the generated path rule in the path rule database 231.

According to an embodiment of the disclosure, the path planner module 230 may store the path rule generated by the NLU module 220 in the path rule database 231. The generated path rule may be added to the path rule set stored in the path rule database 231.

According to an embodiment of the disclosure, the table stored in the path rule database 231 may include a plurality of path rules or a plurality of path rule sets. The plurality of path rule or the plurality of path rule sets may reflect the kind, version, type, or nature of the device performing each path rule.

According to an embodiment of the disclosure, the DM module 240 may determine whether the user's intent grasped by the path planner module 230 is clear. For example, the DM module 240 may determine whether the user's intent is clear based on whether parameter information is sufficient. The DM module 240 may determine whether the parameters grasped by the NLU module 220 are sufficient to perform a task. According to an embodiment of the disclosure, where the user's intent is unclear, the DM module 240 may perform feedback to send a request for necessary information to the user. For example, the DM module 240 may perform feedback to send a request for parameter information to grasp the user's intent.

According to an embodiment of the disclosure, the DM module 240 may include a content provider module. Where the operation can be performed based on the intent and parameters grasped by the NLU module 220, the content provider module may generate the results of performing the task corresponding to the user input. According to an embodiment of the disclosure, the DM module 240 may send the results generated by the content provider module to the user terminal 100 in response to the user input.

According to an embodiment of the disclosure, the NLG module 250 may convert designated information into text. The text information may be in the form of a natural language utterance. The designated information may be, e.g., information about an additional input, information indicating whether the operation corresponding to the user input is complete, or information indicating the user's additional input (e.g., feedback information for the user input). The text information may be sent to the user terminal 100 and displayed on the display 120, or the text information may be sent to the TTS module 260 and converted into a voice.

According to an embodiment of the disclosure, the TTS module 260 may convert text information into voice information. The TTS module 260 may receive the text information from the NLG module 250, convert the text information into voice information, and send the voice information to the user terminal 100. The user terminal 100 may output the voice information through the speaker 130.

According to an embodiment of the disclosure, the NLU module 220, the path planner module 230, and the DM module 240 may be implemented in a single module. For example, the NLU module 220, the path planner module 230, and the DM module 240 may be implemented in a single module to determine the user's intent and parameters and to generate a response (e.g., a path rule) corresponding to the user's intent and parameters. Accordingly, the generated response may be transmitted to the user terminal 100.

Figure 5:
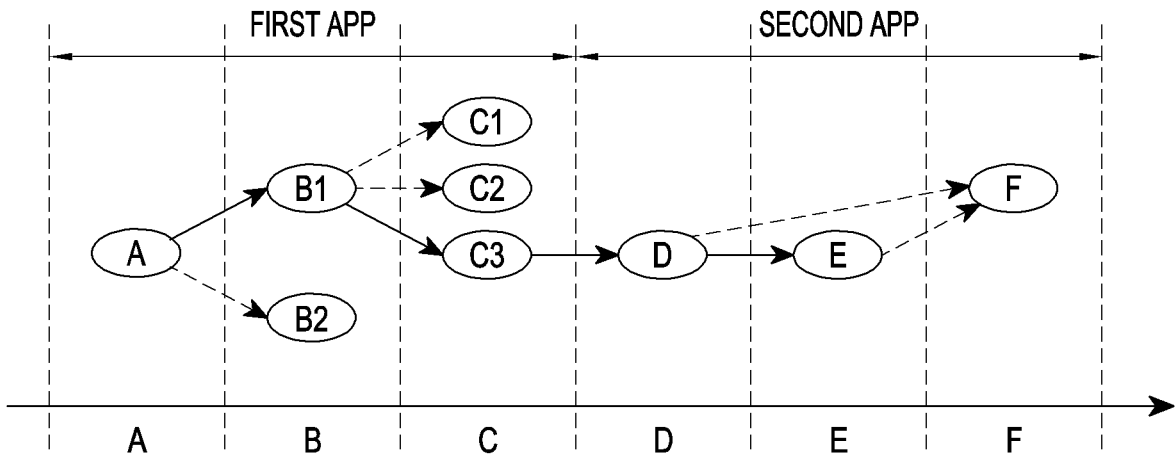
FIG. 5 is a view illustrating a method of generating a path rule by a path natural language understanding module (NLU) according to an embodiment of the disclosure.

FIG. 5 is a view illustrating a method for generating a path rule by a path planner module according to an embodiment of the disclosure.

Referring to FIG. 5, according to an embodiment of the disclosure, the NLU module 220 may separate functions of an application into unit operations A to F and store them in the path rule database 231. For example, the NLU module 220 may store in the path rule database 231 a path rule set including a plurality of path rules, e.g., A-B1-C1, A-B1-C2, A-B1-C3-D-F, and A-B1-C3-D-E-F divided into unit operations.

According to an embodiment of the disclosure, the path rule database 231 of the path planner module 230 may store the path rule set to perform the functions of the application. The path rule set may include a plurality of path rules including the plurality of operations. In the plurality of path rules, the operations executed as per the parameters each inputted to a respective one of the plurality of operations may sequentially be arranged. According to an embodiment of the disclosure, the plurality of path rules may be configured in the form of ontology or a graph model and stored in the path rule database 231.

According to an embodiment of the disclosure, the NLU module 220 may select the optimal one, for example, A-B1-C3-D-F of the plurality of path rules A-B1-C1, A-B1-C2, A-B1-C3-D-F, and A-B1-C3-D-E-F corresponding to the parameters and the intent of the user input.

According to an embodiment of the disclosure, the NLU module 220 may deliver the plurality of path rules to the user terminal 100 unless there is a path rule perfectly matching the user input. For example, the NLU module 220 may select the path rule (e.g., A-B1) partially corresponding to the user input. The NLU module 220 may select one or more path rules (e.g., A-B1-C1, A-B1-C2, A-B1-C3-D-F, A-B1-C3-D-E-F) including the path rule (e.g., A-B1) partially corresponding to the user input and deliver the same to the user terminal 100.

According to an embodiment of the disclosure, the NLU module 220 may select one of the plurality of path rules based on an additional input of the user terminal 100 and deliver the selected path rule to the user terminal 100. For example, the NLU module 220 may select one (e.g., A-B1-C3-D-F) among the plurality of path rules (e.g., A-B1-C1, A-B1-C2, A-B1-C3-D-F, A-B1-C3-D-E-F) as per an additional user input (e.g., an input to select C3) of the user terminal 100 and send the selected path rule to the user terminal 100.

According to an embodiment of the disclosure, the NLU module 220 may determine the user's intent and parameters corresponding to additional user input (e.g., an input to select C3) and send the determined user's intent or parameters to the user terminal 100. The user terminal 100 may select one (e.g., A-B1-C3-D-F) among the plurality of path rules (e.g., A-B1-C1, A-B1-C2, A-B1-C3-D-F, A-B1-C3-D-E-F) based on the parameters or intent sent by the NLU module 220.

Accordingly, the user terminal 100 may complete the operations of the applications 141 and 143 by the selected path rule.

According to an embodiment of the disclosure, where a user input having insufficient information is received by the intelligent server 200, the NLU module 220 may generate a path rule partially corresponding to the received user input. For example, the NLU module 220 may send (①) the partially corresponding path rule to the intelligent agent 145. The intelligent agent 145 may send (②) the partially corresponding path rule to the execution manager module 147, and the execution manager module 147 may execute a first application 141 as per the path rule. The execution manager module 147 may send (③) information about the insufficient parameters to the intelligent agent 145 while executing the first application 141. The intelligent agent 145 may send a request for additional input to the user using the information about the insufficient parameters. Upon receiving an additional input (④) from the user, the intelligent agent 145 may send the same to the intelligent server 200 for processing. The NLU module 220 may generate an added path rule based on the parameter information and intent of the additional user input and send (⑤) the path rule to the intelligent agent 145. The intelligent agent 145 may send ( ) the path rule to the execution manager module 147 to execute a second application 143.

According to an embodiment of the disclosure, where a user input having some missing information is received by the intelligent server 200, the NLU module 220 may send a request for user information to the personal information server 300. The personal information server 300 may send, to the NLU module 220, information about the user who has entered the user input stored in the persona database. The NLU module 220 may select a path rule corresponding to the user input having some missing operations using the user information. Accordingly, although a user input having some missing information is received by the intelligent server 200, the NLU module 220 may send a request for the missing information and receive an additional input, or the NLU module 220 may use the user information, determining a path rule corresponding to the user input.

The electronic device according to various embodiments may be one of various types of electronic devices. The electronic devices may include, e.g., a portable communication device (e.g., a smartphone), a computer device, a portable multimedia device, a portable medical device, a camera, a wearable device, or a home appliance. According to an embodiment of the disclosure, the electronic device is not limited to the above-listed embodiments.

It should be appreciated that various embodiments of the disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used herein, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, a module may be implemented in the form of an application-specific integrated circuit (ASIC).

Various embodiments as set forth herein may be implemented as software (e.g., a program) including one or more instructions that are stored in a storage medium (e.g., internal memory or external memory) that is readable by a machine (e.g., the electronic device 100). For example, a processor (e.g., the processor 150) of the machine (e.g., the electronic device 100) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program products may be traded as commodities between sellers and buyers. The computer program product may be distributed in the form of a machine-readable storage medium (e.g., compact disc read only memory (CD-ROM)), or be distributed (e.g., downloaded or uploaded) online via an application store (e.g., Play Store™), or between two user devices (e.g., smartphones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

Figure 6:
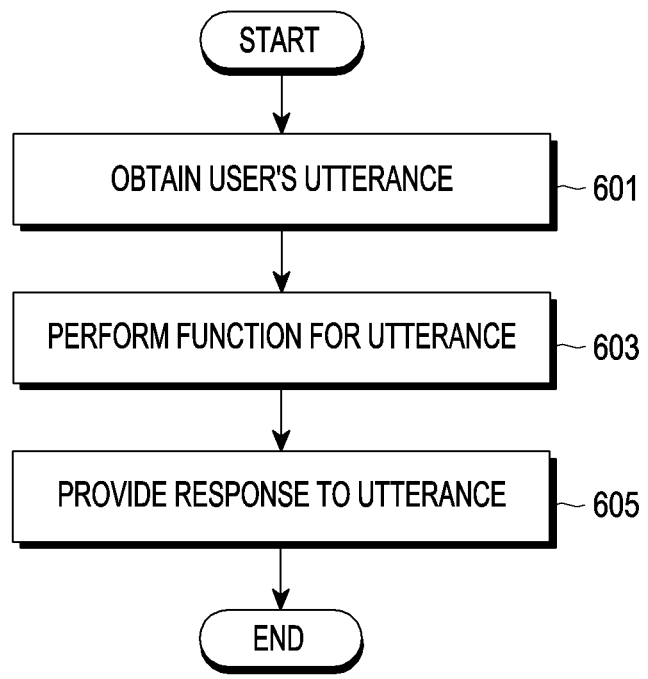
FIG. 6 is a flowchart illustrating a method of operating an electronic device according to an embodiment.

FIG. 6 is a flowchart illustrating a method of operating an electronic device according to an embodiment.

Referring to FIG. 6, an electronic device (e.g., the user terminal 100 of FIG. 1) may obtain the user's utterance through a microphone included in the electronic device 100 in operation 601.

According to an embodiment, the electronic device 100 may transmit first information about the user's utterance through a communication circuit included in the electronic device 100 to an external server (e.g., the intelligent server 200 of FIG. 1). For example, the first information may include voice information about the user's utterance. The first information may also include information about a text, image, and video related to the user's utterance.

According to an embodiment, the external server 200 may at least partially perform automatic speech recognition (ASR) and/or natural language understanding (NLU). Further, the external server 200 may perform ASR and/or NLU, thereby generating a neutral response to the user's utterance. For example, the neutral response may include at least one first text.

In operation 603, the electronic device 100 may perform a function for the user's utterance. For example, when the user's utterance includes content to request the electronic device 100 to perform a particular function, the electronic device 100 may perform the particular function.

In operation 605, the electronic device 100 may obtain or receive information about the response to the user's utterance from the external server 200. For example, the response obtained by the electronic device 100 from the external server 200 may include at least one second text. The second text may be a text resulting from modifying at least part of the first text included in the neutral response by the external server 200. Further, the second text may be a text resulting from adding a new text to the first text.

According to an embodiment, the external server 200 may identify the user's conversation style and emotion based on first information and obtain parameters corresponding to the identified conversation style and emotion. Further, the external server 200 may change the first text to the second text based on the parameters corresponding to the conversation style and emotion.

In operation 605, the electronic device 100 may obtain a response to the user's utterance from the external server 200 and provide the obtained response through a voice and/or message. For example, the electronic device 100 may display the response to the user's utterance as a text through the display included in the electronic device 100 or output the response to the user's utterance as a voice through the speaker included in the electronic device 100.

According to an embodiment, the electronic device 100 may provide a response to the user's utterance on its own without the external server 200. For example, the user's utterance may be obtained through the microphone included in the electronic device 100. The electronic device 100 may at least partially perform ASR and/or NLU based on the user's utterance. Further, the electronic device 100 may perform ASR and/or NLU, thereby obtaining or generating a neutral response to the user's utterance. The electronic device 100 may identify the user's conversation style and emotion based on the user's utterance or first information about the user's utterance and obtain parameters corresponding to the identified conversation style and emotion. Further, the electronic device 100 may change a first text contained in a first response to a second text based on the parameters corresponding to the conversation style and emotion and obtain a second response containing the second text. The electronic device 100 may provide the obtained second response through a voice and/or message.

Figure 7:
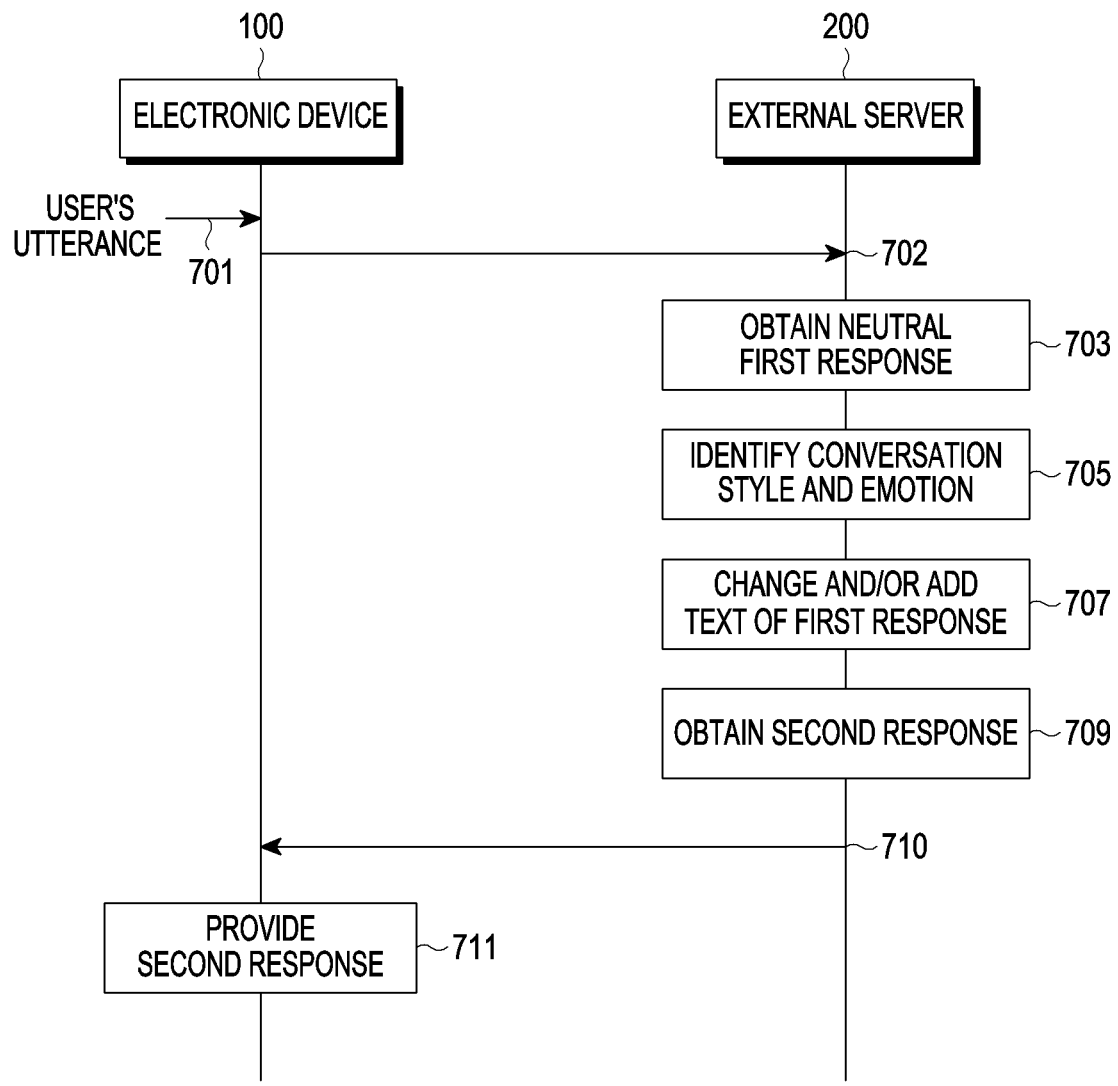
FIG. 7 is a data flowchart illustrating operations of a user terminal and a server in an integrated intelligence system according to an embodiment.

FIG. 7 is a data flowchart illustrating operations of a user terminal and a server in an integrated intelligence system according to an embodiment.

Referring to FIG. 7, an electronic device (e.g., the user terminal 100 of FIG. 1) may receive the user's utterance in operation 701. For example, the electronic device 100 may receive the user's utterance through a microphone included in the electronic device 100.

In operation 702, the electronic device 100 may transmit first information about the user's utterance to an external server (e.g., the intelligent server 200 of FIG. 2).

In operation 703, the external server 200 may obtain a neutral first response based on the first information. For example, prior to obtaining the first response, the external server 200 may recognize the content of the user's utterance based on the first information and obtain or generate the first response corresponding to the user's utterance based on the recognized content.

For example, the first response may include a neutral text without considering the user's emotion or conversation style included in the user's utterance.

In operation 705, the external server 200 may identify the user's conversation style and/or emotion based on the first information. For example, the user's conversation style may mean the style of the user talking with another party, such as the style of talking with a close friend, the style of talking among persons of a similar age group (e.g., teens), or the style of talking with persons of a different age or status. The user's emotion could be like, hate, positive, negative, urgent, relaxed, happy, unhappy, delighted, sad, angry, or cranky.

According to an embodiment, the external server 200 may determine any one of a plurality of predefined conversation styles based on the first information. The external server 200 may determine any one of a plurality of predefined emotions based on the first information. The plurality of predefined conversation styles and emotions may be supported by the external server 200.

In operation 707, the external server 200 may change at least part of the text contained in the first response based on the user's conversation style and emotion identified. The external server 200 may add a new text corresponding to the user's conversation style and emotion to the first response. In other words, the external server 200 may change the text contained in the first response or add a new text based on the user's conversation style and emotion.

In operation 709, the external server 200 may generate or obtain a second response which is a new response based on the first response based on the user's conversation style and emotion. For example, the second response may include at least one text reflecting the user's conversation style and emotion based on the first response.

In operation 710, the electronic device 100 may receive information about the second response from the external server 200. For example, the information about the second response may include the text contained in the second response, voice information, and an image and video related to the second response.

In operation 711, the electronic device 100 may provide the second response through a voice or a message. For example, the electronic device 100 may output a voice corresponding to the second response through the speaker included in the electronic device 100. The electronic device 100 may display the text corresponding to the second response through the display included in the electronic device 100. The electronic device 100 may display an image or video related to the second response through the display included in the electronic device 100. For example, the electronic device 100 may display, on the display, the text corresponding to the second response, together with the image or video related to the second response.

Figure 8:
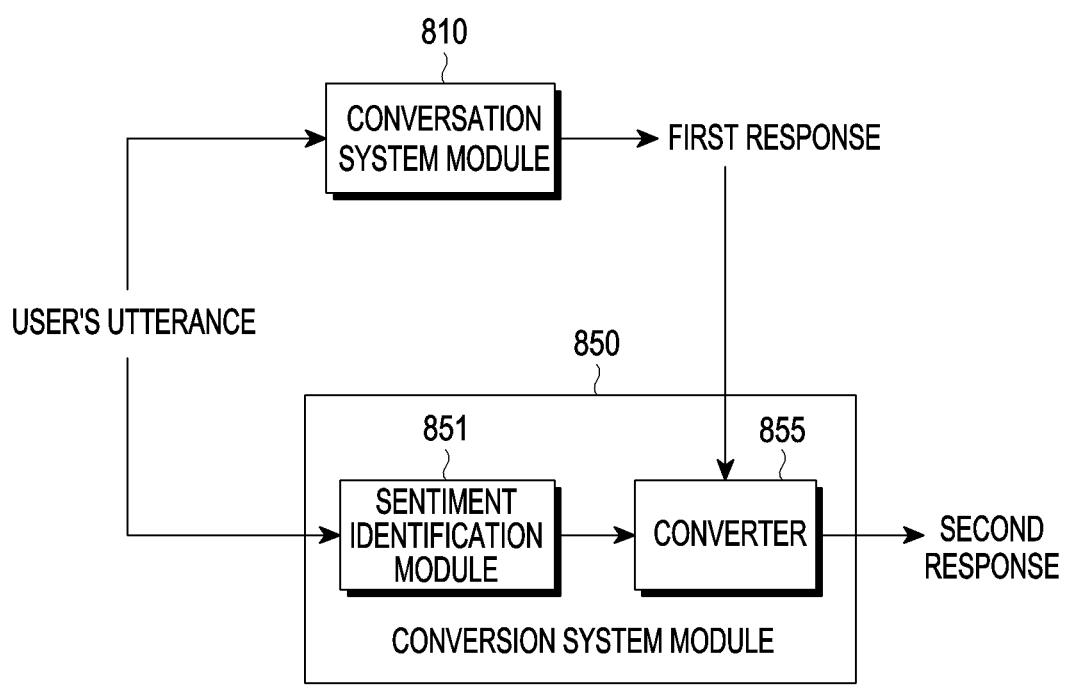
FIG. 8 is a view illustrating an operation of changing a first response to a second response by a server according to an embodiment.

FIG. 8 is a view illustrating an operation of changing a first response to a second response by a server according to an embodiment.

Referring to FIG. 8, an external server (e.g., the intelligent server 200 of FIG. 1) may include a conversation system module 810 and a conversion system module 850.

According to an embodiment, the conversation system module 810 may recognize or identify the content of the user's utterance and generate a first response to the user's utterance based on the result of recognition. The first response may include a neutral text and/or voice information corresponding to the neutral text. For example, the conversation system module 810 may include at least one of the components 210 to 260 described above in connection with FIG. 4. In other words, the conversation system module 810 may perform at least one function of the components 210 to 260 described above in connection with FIG. 4.

According to an embodiment, the conversion system module 850 may identify the user's sentiment (e.g., the user's conversation style and emotion) from the user's utterance and change or adjust the neutral first response according to the user's sentiment identified. The conversion system module 850 may generate a second response changed or adjusted according to the user's sentiment with respect to the first response. For example, the conversion system module 850 may be implemented using a deep learning architecture.

According to an embodiment, the conversion system module 850 may include a sentiment identification module 851 and a converter 855. The sentiment identification module 851 may identify the user's sentiment (e.g., the user's conversation style and emotion) from the user's utterance. For example, the sentiment identification module 851 may analyze the text (e.g., whether a particular word is included and the use frequency) corresponding to the user's utterance or analyze the amplitude and/or speed of the voice corresponding to the user's utterance, thereby identifying the user's sentiment. The sentiment identification module 851 may output the result of identification (e.g., a parameter for the user's conversation style and a parameter for the user's emotion) to the converter 855. The converter 855 may change or adjust the neutral first response based on the user's sentiment identified by the sentiment identification module 851 and generate a second response. For example, the second response may be a sentimental response as compared with the first response.

Although FIG. 8 illustrates that the sentiment identification module 851 identifies the user's sentiment from the user's utterance for illustrative purposes, the technical spirit of the disclosure is not limited thereto. For example, the sentiment identification module 851 may identify the user's sentiment based on the content or intent of the user's utterance identified by the conversation system module 810. In other words, the sentiment identification module 851 may identify the user's conversation style and emotion based on the content or intent of the user's utterance identified by the conversation system module 810.

Figure 9A:
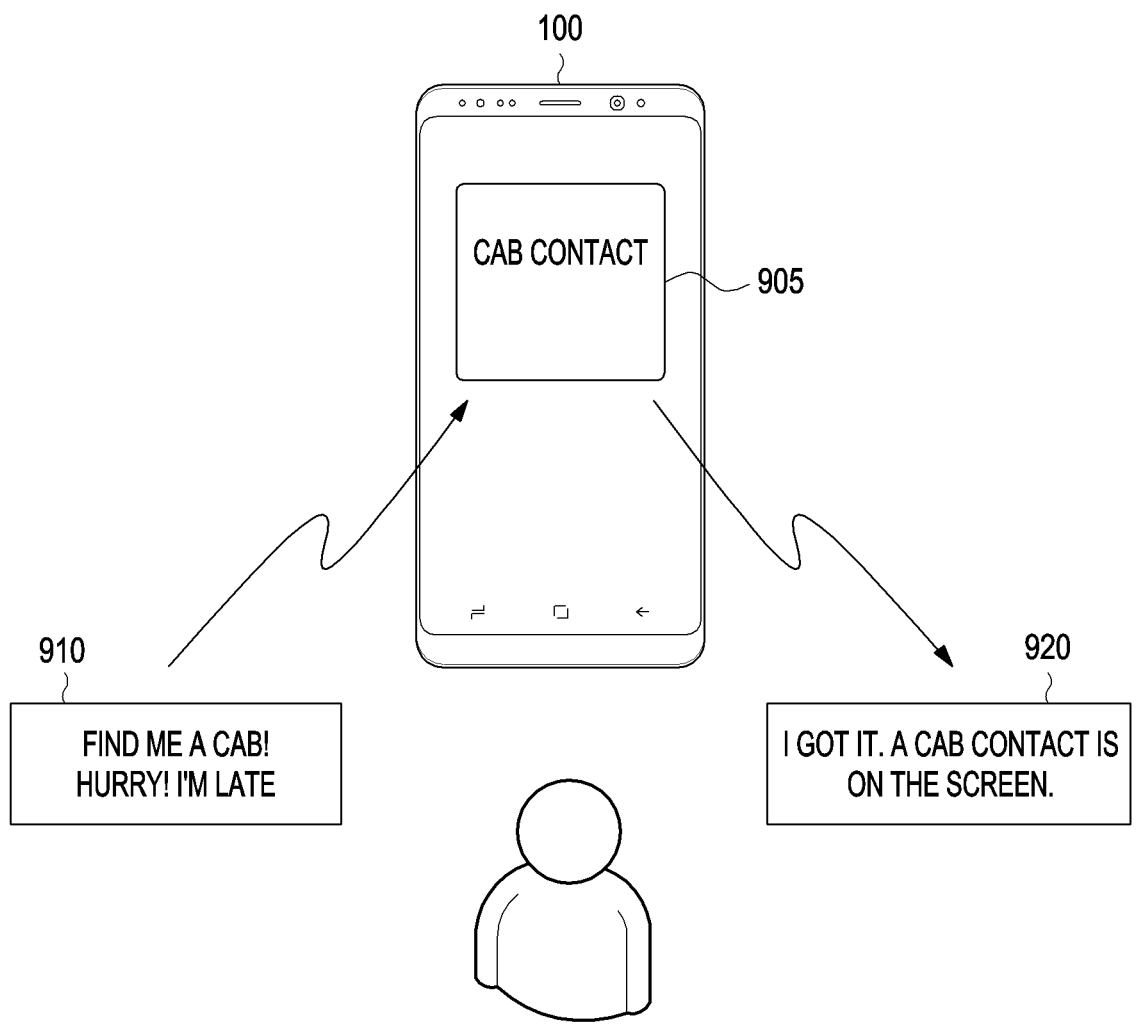
FIGS. 9A and 9B are views illustrating an operation of providing a response to a user's utterance by an electronic device according to an embodiment.
Figure 9B:
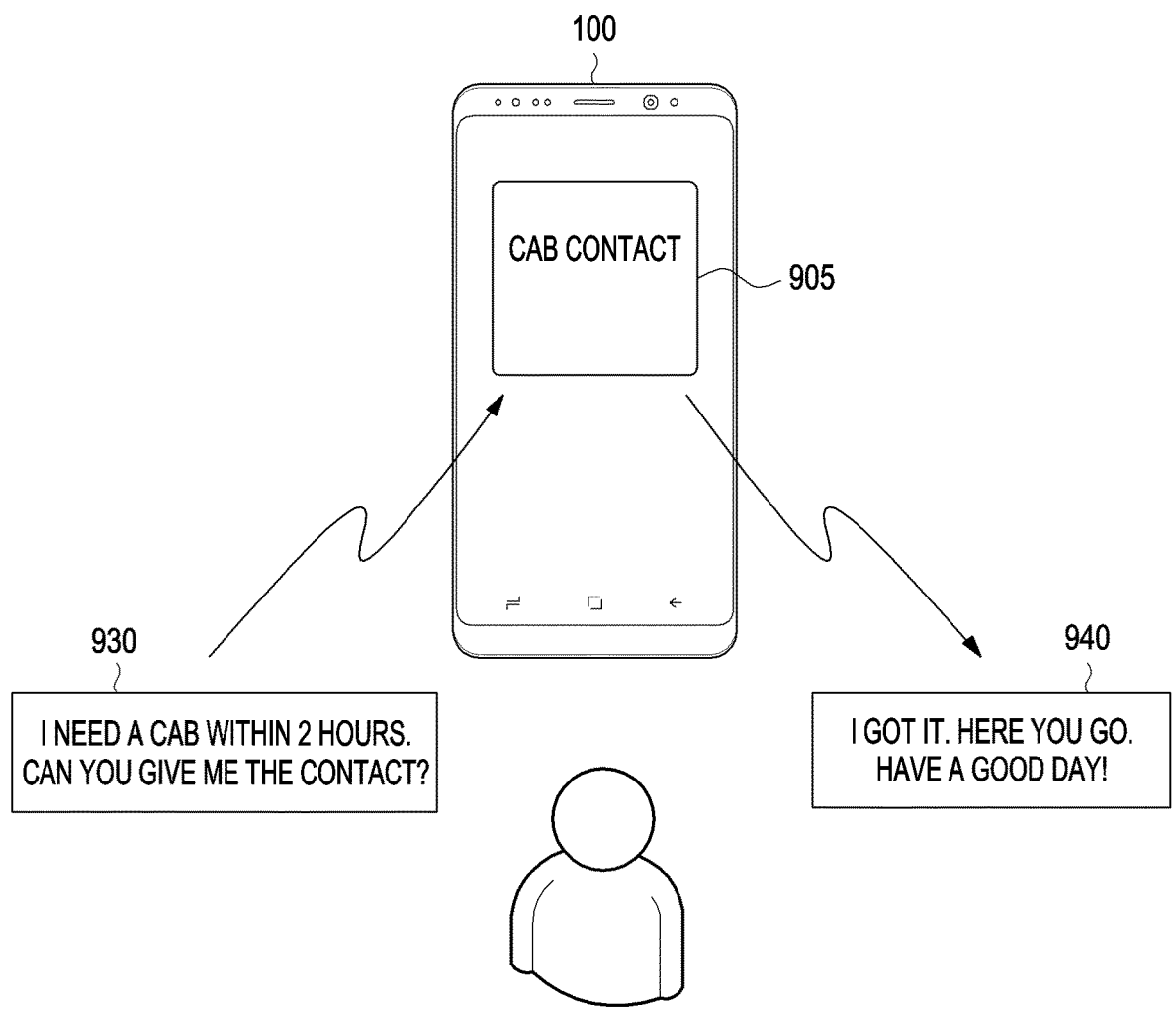

FIGS. 9A and 9B are views illustrating an operation of providing a response to a user's utterance by an electronic device according to an embodiment.

Referring to FIGS. 9A and 9B, the electronic device 100 may provide a response matching the user's conversation style and emotion in response to the user's utterance using the external server 200.

Referring to FIG. 9A, the electronic device 100 may obtain the user's utterance 910 through a microphone included in the electronic device 100. For example, the user's utterance may be "Find me a cab! Hurry! I'm late."

According to an embodiment, the electronic device 100 may perform a particular function (e.g., the function of looking up and providing a contact for a cab) based on the intent or content of the user's utterance identified by the external server 200. For example, the electronic device 100 may display information 905 about the cab contact on the display of the electronic device 100.

According to an embodiment, the external server 200 may analyze the user's utterance, thereby identifying or determining the user's conversation style and emotion. For example, the external server 200 may determine that the user's emotion is urgent through a particular word (e.g., "hurry" and/or "late"). The external server 200 may analyze the amplitude and/or speed of the voice corresponding to the user's utterance and determine that the user's emotion is urgency. The external server 200 may determine that the user's conversation style is the style of the user talking to a friend through a particular word (e.g., "Find me a cab" or "I'm late"). The external server 200 may change or adjust the neutral response (e.g., the neutral response may be "Sir, I got it. A cab contact is on the screen.") considering the user's emotion (e.g., urgency) and conversation style (e.g., the style of talking with a friend), thereby generating a second response reflecting the user's conversation style and emotion.

According to an embodiment, the electronic device 100 may obtain the second response to the user's utterance through the external server 200. The electronic device 100 may output the obtained second response as a voice through the speaker of the electronic device 100. For example, the voice 920 corresponding to the second response may be "I got it. A cab contact is on the screen."

Referring to FIG. 9B, the electronic device 100 may obtain the user's utterance 930 through a microphone included in the electronic device 100. For example, the user's utterance may be "I need a cab within two hours. Give me a contact."

According to an embodiment, the external server 200 may analyze the user's utterance, thereby identifying or determining the user's conversation style and emotion. For example, the external server 200 may determine that the user's emotion is relaxed through the speed of the voice and/or a particular word (e.g., "within two hours") of "I need a cab within two hours. Give me a contact." The external server 200 may determine that the user's conversation style is the style of talking with a close friend through a particular sentence (e.g., "Give me"). The external server 200 may change or adjust the neutral response considering the user's emotion (e.g., relaxed) and conversation style (e.g., the style of talking with a close friend), thereby generating a second response reflecting the user's conversation style and emotion.

According to an embodiment, the electronic device 100 may obtain the second response to the user's utterance through the external server 200. The electronic device 100 may output the obtained second response as a voice 940 through the speaker of the electronic device 100. For example, the voice 940 corresponding to the second response may be "I got it. Here you go. Have a good day!"

Figure 10:
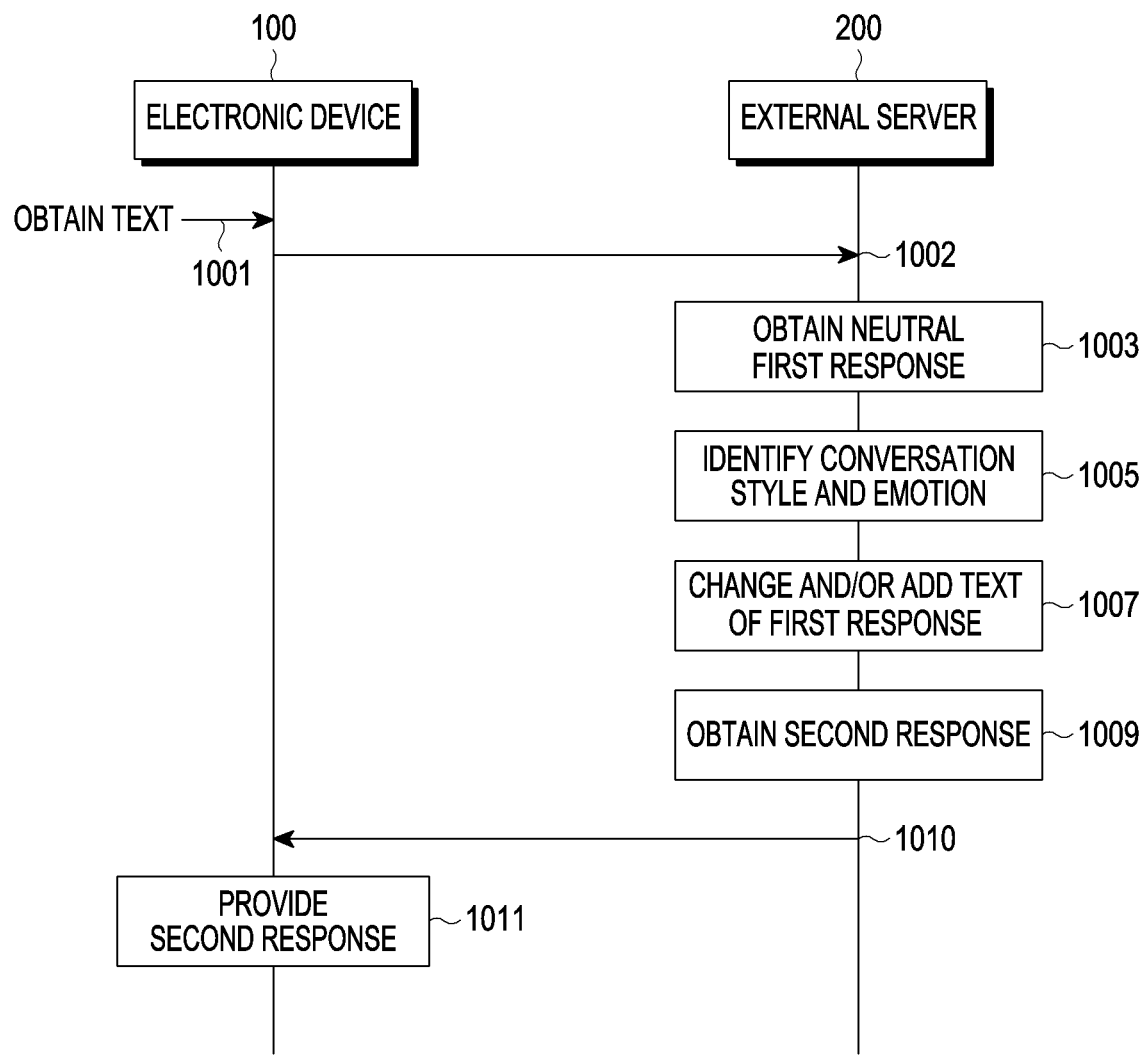
FIG. 10 is a data flowchart illustrating operations of a user terminal and a server in an integrated intelligence system according to an embodiment.

FIG. 10 is a data flowchart illustrating operations of a user terminal and a server in an integrated intelligence system according to an embodiment.

Referring to FIG. 10, an electronic device (e.g., the user terminal 100 of FIG. 1) may obtain a text in operation 1001. For example, the electronic device 100 may obtain a text displayed on the display included in the electronic device 100. For example, the electronic device 100 may receive a message from another party on a messenger and obtain text contained in the message.

In operation 1002, the electronic device 100 may transmit information about the text to an external server (e.g., the intelligent server 200 of FIG. 2).

In operation 1003, the external server 200 may obtain a neutral first response based on the information about the text. For example, before obtaining the first response, the external server 200 may recognize the content or intent of the text based on the information about the text and obtain or generate a first response corresponding to the text based on the recognized content. For example, the first response may include a neutral text without considering the user's emotion or conversation style included in the text.

In operation 1005, the external server 200 may identify the user's conversation style and/or emotion based on the text information. For example, the external server 200 may determine any one of a plurality of predefined conversation styles based on the text information. Further, the external server 200 may determine any one of a plurality of predefined emotions based on the text information.

In operation 1007, the external server 200 may change the text contained in the first response or add a new text based on the user's conversation style and emotion.

In operation 1009, the external server 200 may generate or obtain a second response which is a new response based on the first response based on the user's conversation style and emotion. For example, the second response may include at least one text reflecting the user's conversation style and emotion based on the first response.

In operation 1010, the electronic device 100 may receive information about the second response from the external server 200. For example, the information about the second response may include the text contained in the second response, voice information, and an image and video related to the second response.

In operation 1011, the electronic device 100 may provide the second response through a voice or a message. For example, the electronic device 100 may display the text corresponding to the second response through the display included in the electronic device 100. The electronic device 100 may display an image or video related to the second response through the display included in the electronic device 100.

Figure 11A:
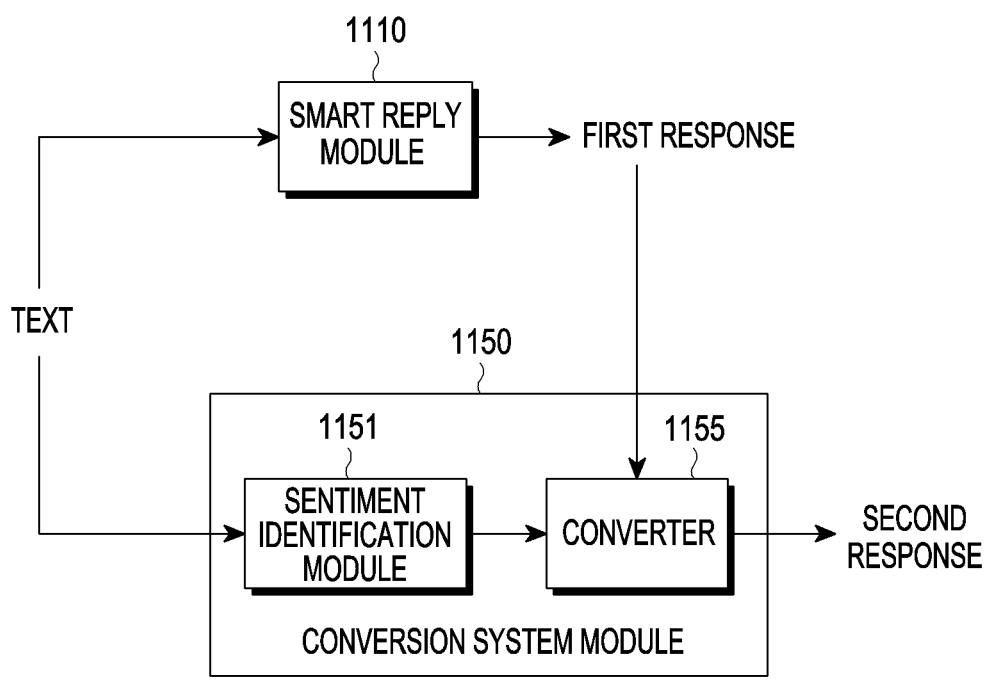
FIGS. 11A and 11B are views illustrating an operation of changing a first response to a second response by a server according to an embodiment.
Figure 11B:
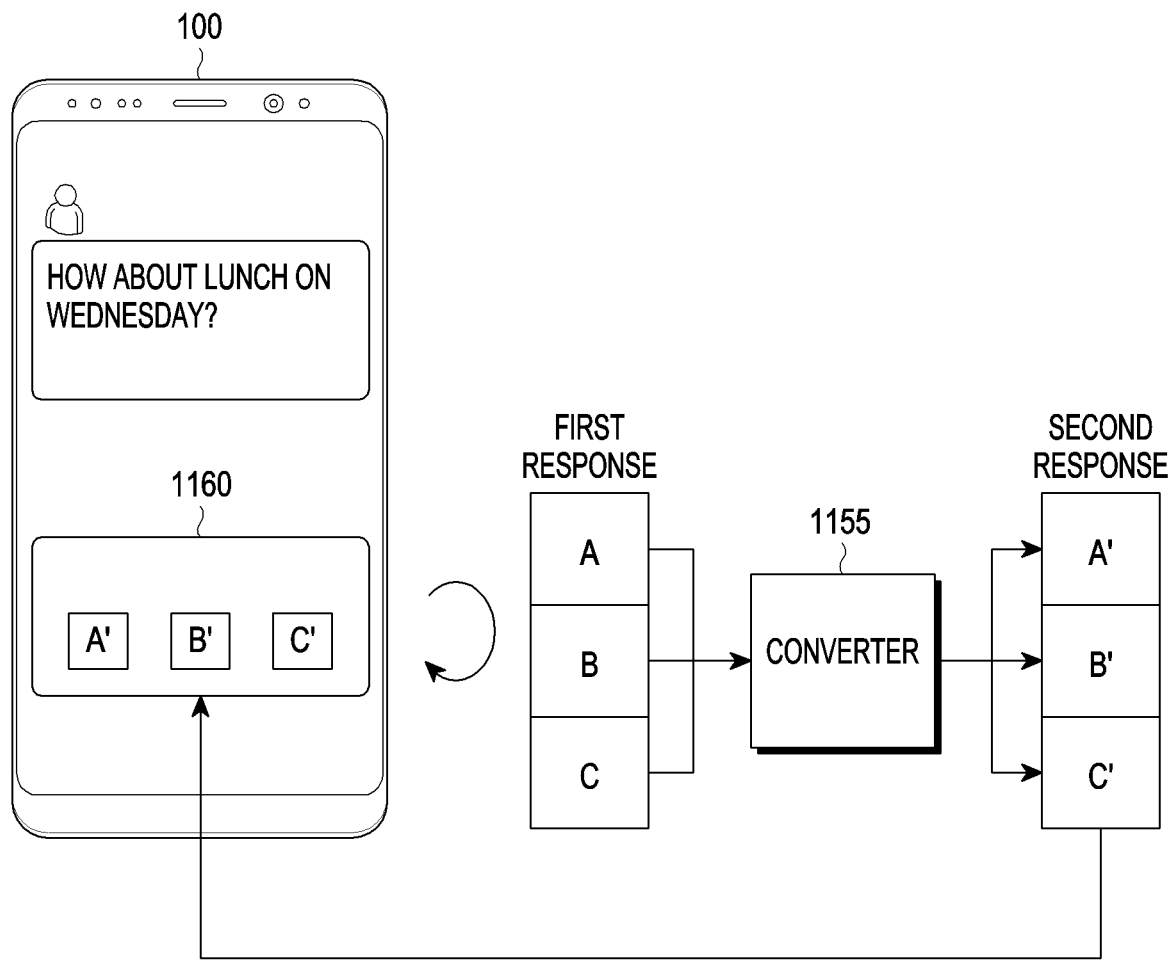

FIGS. 11A and 11B are views illustrating an operation of changing a first response to a second response by a server according to an embodiment.

Referring to FIG. 11A, an external server (e.g., the intelligent server 200 of FIG. 1) may include a smart reply module 1110 and a conversion system module 1150.

According to an embodiment, the smart reply module 1110 may recognize the content of a text and, based on the result of recognition, generate a first response to the text. The first response may include a neutral text and/or voice information corresponding to the neutral text. For example, the smart reply module 1110 may include at least one of the components 210 to 260 described above in connection with FIG. 4. In other words, the smart reply module 1110 may perform at least one function of the components 210 to 260 described above in connection with FIG. 4.

According to an embodiment, the conversion system module 1150 may identify the user's sentiment (e.g., the user's conversation style and emotion) from the text and change or adjust the neutral first response according to the user's sentiment identified. In other words, the conversion system module 1150 may generate a second response changed or adjusted according to the user's sentiment with respect to the first response. For example, the conversion system module 1150 may be implemented using a deep learning architecture.

According to an embodiment, the conversion system module 1150 may include a sentiment identification module 1151 and a converter 1155. The sentiment identification module 1151 may identify the user's sentiment (e.g., the user's conversation style and emotion) from the text. For example, the sentiment identification module 1151 may analyze the text (e.g., whether a particular word is included and the use frequency), thereby identifying the user's sentiment. The sentiment identification module 1151 may output the result of identification (e.g., a parameter for the user's conversation style and a parameter for the user's emotion) to the converter 1155. The converter 1155 may change or adjust the neutral first response based on the user's sentiment identified by the sentiment identification module 1151 and generate a second response. For example, the second response may be a sentimental response compared to the first response.

Although FIG. 11A illustrates that the sentiment identification module 1151 identifies the user's sentiment from the text for illustrative purposes, the technical spirit of the disclosure is not limited thereto. For example, the sentiment identification module 1151 may identify the user's sentiment based on the content or intent of the text identified by the smart reply module 1110. In other words, the sentiment identification module 1151 may identify the user's conversation style and emotion based on the content or intent of the text identified by the smart reply module 1110.

Referring to FIG. 11B, the external server 200 may obtain at least one neutral first response (e.g., A, B, and C). The external server 200 may change or adjust at least one first response into at least one second response (A', B', and C') using the converter 1155. The at least one second response (A', B', and C') may be a sentimental response reflecting the user's conversation style and emotion.

According to an embodiment, upon obtaining or receiving at least one second response (A', B', and C') from the external server 200, the electronic device 100 may display information 1160 including at least one second response (A', B', and C') on the display of the electronic device 100. For example, the electronic device 100 may provide the other party with a response selected by the user from among at least one second response (A', B', and C') through a messenger.

Figure 12:
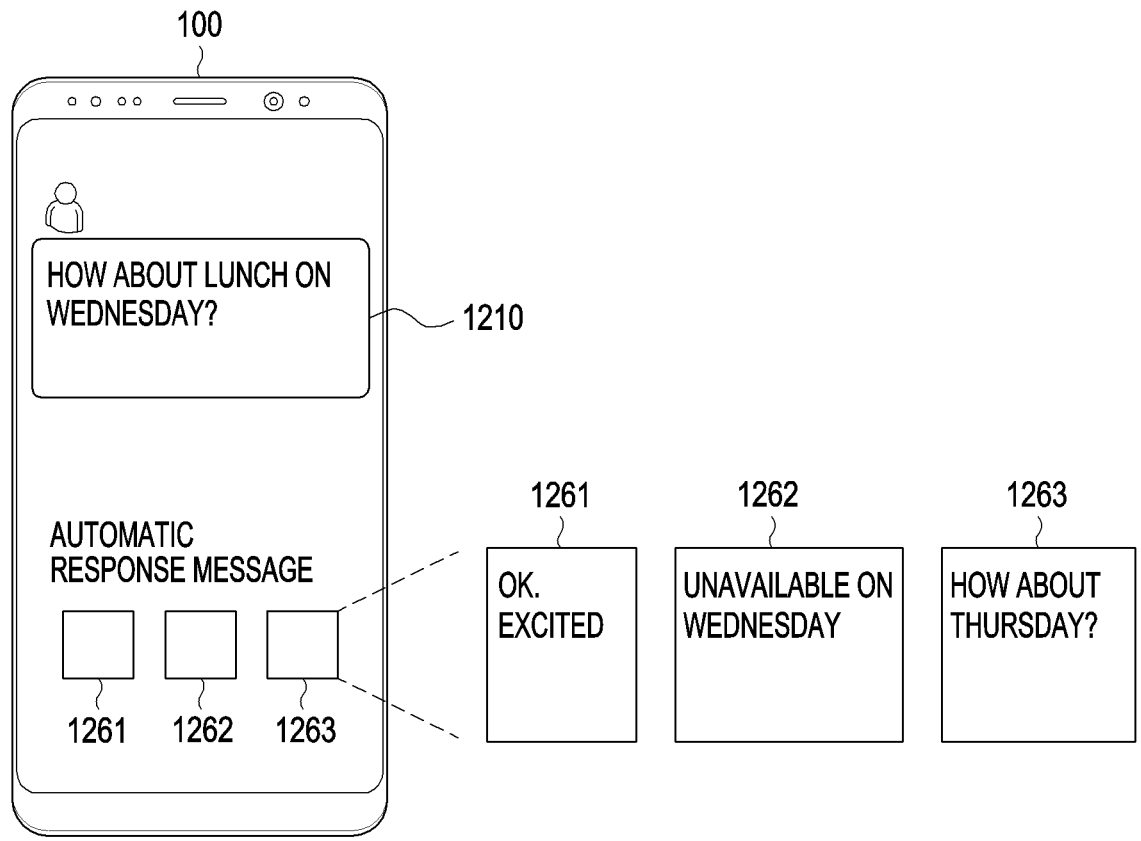
FIG. 12 is a view illustrating an operation of providing a response to text by an electronic device according to an embodiment.

FIG. 12 is a view illustrating an operation of providing a response to text by an electronic device according to an embodiment.

Referring to FIG. 12, the electronic device 100 may obtain a text 1210 through an application (e.g., a messenger application) running on the electronic device 100. The text 1210 may be displayed on the display of the electronic device 100. For example, the text 1210 may be "How about lunch on Wednesday?"

According to an embodiment, the external server 200 may analyze the text, thereby identifying or determining the user's conversation style and emotion. For example, the external server 200 may determine that the user's emotion is good through a particular word or symbol (e.g., "Wednesday," "have lunch," and/or "?") in "How about lunch on Wednesday?" Further, the external server 200 may determine that the user's conversation style is the style of talking with a friend through a particular word (e.g., "lunch" and/or "How about"). The external server 200 may change or adjust at least one neutral response considering the user's emotion (e.g., good) and conversation style (e.g., the style of talking with a friend) and generate a second response reflecting the user's conversation style and emotion. For example, when the neutral first response is "available," the second response may be "Ok. I'm looking forward to it." When the neutral first response is "unavailable," the second response may be "Wednesday doesn't work for me." When the neutral first response is "Wednesday doesn't work for me, but Thursday is ok," the second response may be "How about Thursday?"

According to an embodiment, the electronic device 100 may obtain a second response to the text of the application (e.g., a messenger application) through the external server 200. The electronic device 100 may display texts 1261, 1262, and 1263 for at least one second response on the display of the electronic device 100. For example, the electronic device 100 may transfer or provide a response selected by the user from among at least one of the second responses 1261, 1262, and 1263 to another party through the messenger. The electronic device 100 may also automatically select a response that the electronic device 100 predicts will be the likeliest preference of the user, without the user's explicit selection, from among at least one of the second responses 1261, 1262, and 1263 and transfer or provide the selected response to the other party through the messenger.

Figure 13:
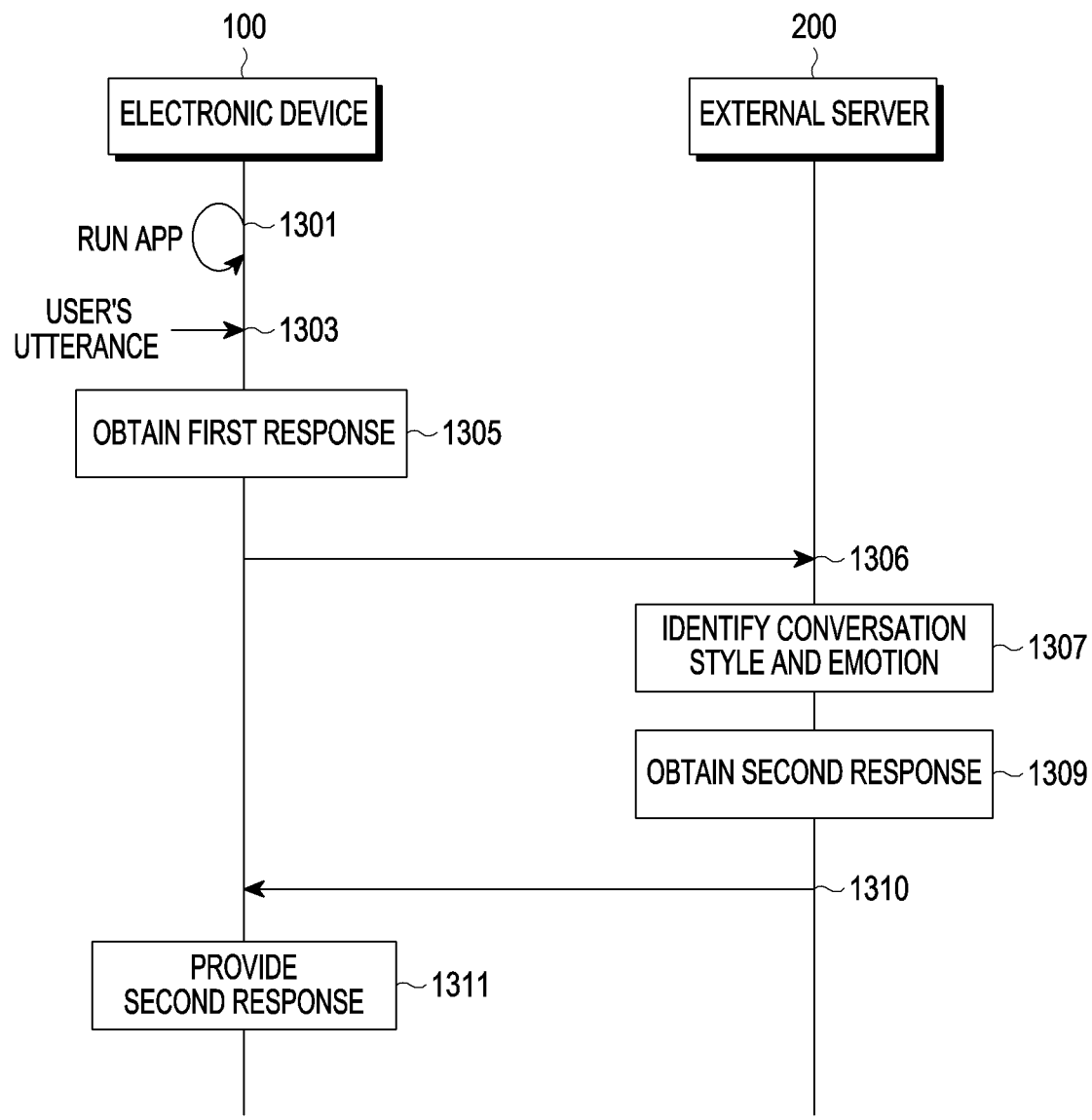
FIG. 13 is a data flowchart illustrating operations of a user terminal and a server in an integrated intelligence system according to an embodiment.

FIG. 13 is a data flowchart illustrating operations of a user terminal and a server in an integrated intelligence system according to an embodiment.

Referring to FIG. 13, an electronic device (e.g., the user terminal 100 of FIG. 1) may run an application (or app) in operation 1301. For example, the application may have its own natural language generating system or natural language recognizing system.

In operation 1303, the electronic device 100 may obtain the user's utterance.

In operation 1305, the application running on the electronic device 100 may obtain a first response to the user's utterance using the natural language generating system. For example, the first response may include a neutral text or voice corresponding to the text that does not reflect the user's conversation style or emotion.

In operation 1306, the electronic device 100 may transmit information about the first response to an external server (e.g., the intelligent server 200 of FIG. 2).

In operation 1307, upon receiving the information about the first response, the external server 200 may identify the user's conversation style and/or emotion. For example, the external server 200 may obtain information about the user's conversation style and/or emotion through the persona module 155*b* described above in connection with FIG. 2. For example, the external server 200 may determine any one among a plurality of predefined conversation styles based on the information obtained through the persona module 155*b* and determine any one of a plurality of predefined emotions.

In operation 1309, the external server 200 may change the text included in the first response or add a new text based on the user's conversation style and emotion, thereby generating or obtaining a second response. For example, the second response may include at least one text reflecting the user's conversation style and emotion based on the first response.

In operation 1310, the electronic device 100 may receive information about the second response from the external server 200. For example, the information about the second response may include the text contained in the second response, voice information, and an image and video related to the second response.

In operation 1311, the electronic device 100 may provide the second response through a voice or a message. For example, the electronic device 100 may display the text corresponding to the second response through the display included in the electronic device 100.

Figure 14:
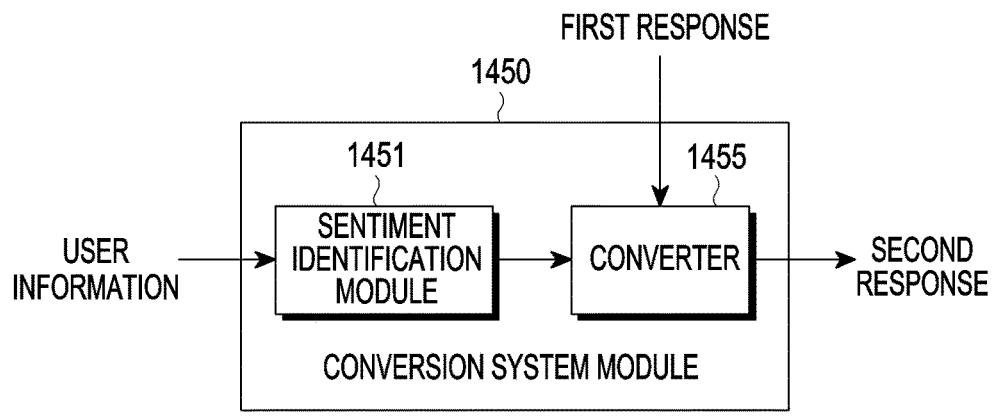
FIG. 14 is a view illustrating an operation of changing a first response to a second response by a server according to an embodiment.

FIG. 14 is a view illustrating an operation of changing a first response to a second response by a server according to an embodiment.

Referring to FIG. 14, an external server (e.g., the intelligent server 200 of FIG. 1) may include a conversion system module 1450.

According to an embodiment, the conversion system module 1450 may obtain information about the user's sentiment (e.g., the user's conversation style and emotion) and a neutral first response from an electronic device (e.g., the user terminal 100 of FIG. 1)

According to an embodiment, the conversion system module 1450 may change or adjust the neutral first response according to the user's sentiment (e.g., the user's conversation style and emotion) obtained from the persona module 149*b* of FIG. 2. In other words, the conversion system module 1450 may generate a second response changed or adjusted according to the user's sentiment with respect to the first response. For example, the conversion system module 1450 may be implemented using a deep learning architecture.

According to an embodiment, the conversion system module 1450 may include a sentiment identification module 1451 and a converter 1455. The sentiment identification module 1451 may identify the user's sentiment (e.g., the user's conversation style and emotion) from user information obtained through the persona module 149*b*. For example, the sentiment identification module 1451 may analyze data contained in the user information, thereby identifying the user's sentiment. The sentiment identification module 1451 may output the result of identification (e.g., a parameter for the user's conversation style and a parameter for the user's emotion) to the converter 1455. The converter 1455 may change or adjust the neutral first response based on the user's sentiment identified by the sentiment identification module 1451 and generate a second response. For example, the second response may be a sentimental response as compared with the first response.

Figure 15:
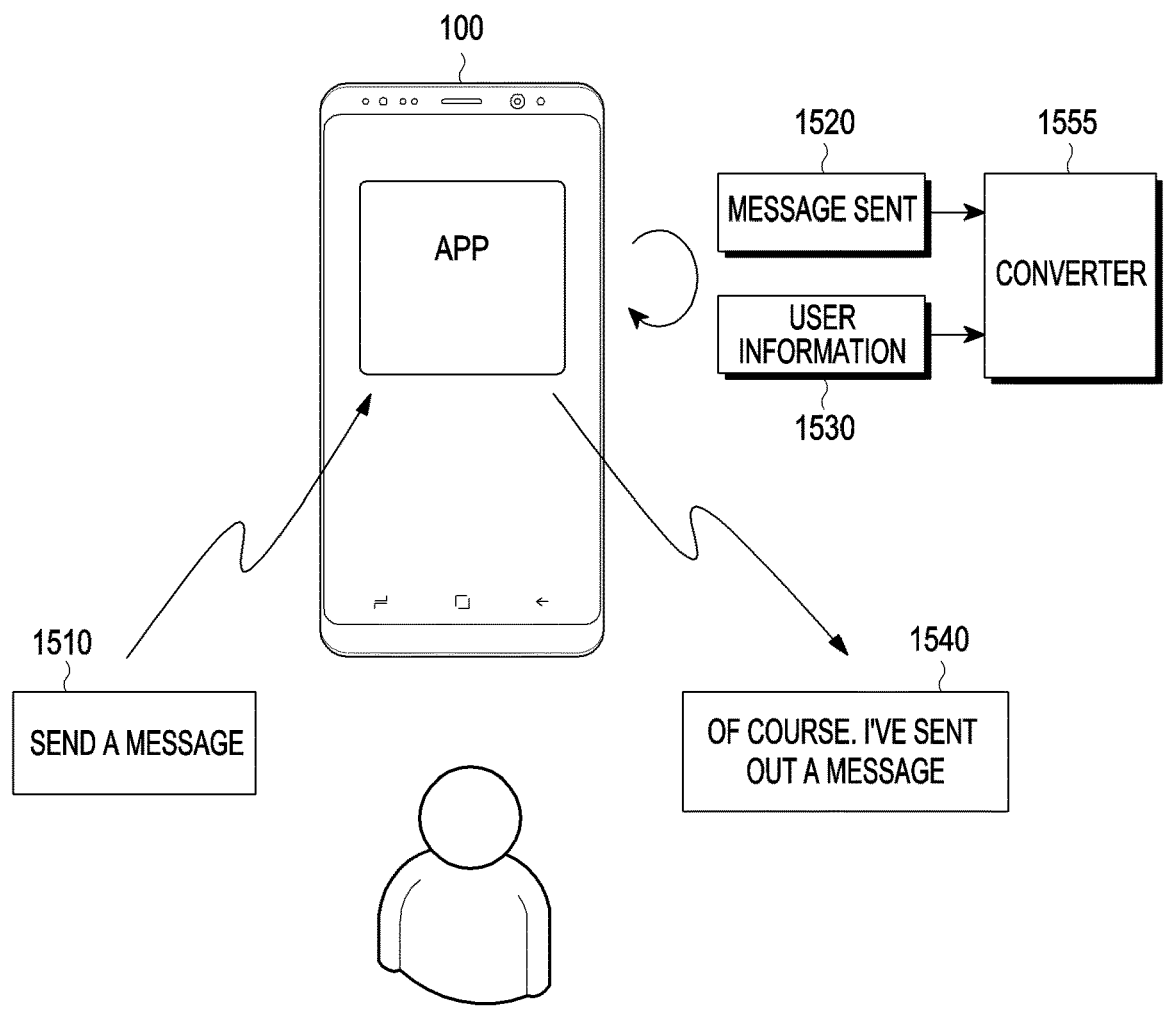
FIG. 15 is a view illustrating an operation of providing a response to a user's utterance by an electronic device according to an embodiment.

FIG. 15 is a view illustrating an operation of providing a response to a user's utterance by an electronic device according to an embodiment.

Referring to FIG. 15, the electronic device 100 may run an application. For example, the application (APP) may include a third-party application that a natural language generating system or natural language recognizing system provides on its own.

According to an embodiment, the electronic device 100 may obtain the user's utterance 1510 through a microphone included in the electronic device 100. For example, the user's utterance 1510 may be "send a message."

According to an embodiment, the application (APP) may analyze the user's utterance and determine the intent and content of the user's utterance. Further, the application (APP) may generate a neutral first response 1520 to the user's utterance. For example, the first response 1520 may be "a message has been sent out." The electronic device 100 may obtain user information 1530 through a persona module (e.g., the persona module 149*b* of FIG. 2). For example, the electronic device 100 may obtain the user information 1530 from the user-related information stored in the electronic device 100 and/or stored in an external device. For example, the user information 1530 may contain information about the user's conversation style and emotion.

According to an embodiment, the external server 200 may receive or obtain the user information 1530 and information about the first response 1520 from the electronic device 100. The external server 200 may change and adjust, through the converter 1555, the text contained in the first response 1520 based on the user information 1530 and generate a second response 1540. For example, the second response 1540 may be a response reflecting the user's sentiment, e.g., "Of course. I've sent out the message."

The electronic device 100 may receive or obtain information about the second response 1540 from the external server 200 and output the second response 1540 through a voice.

As described above in connection with FIGS. 7 to 15, the external server 200 may further include a conversion system module 850, 1150, or 1450. In other words, the external server 200 may further include the conversion system module 850, 1150, or 1450, thereby identifying the user's conversation style and emotion and obtaining or generating a response reflecting the identified conversation style and emotion. For example, the conversion system module 850, 1150, or 1450 may be implemented as a plug-in in the external server 200.

According to an embodiment, the conversion system module 850, 1150, or 1450 may include the sentiment identification module 851, 1151, or 1451. The sentiment identification module 851, 1151, or 1451 may identify or recognize the user's conversation style and emotion. The sentiment identification module may also identify or recognize the user's context. An operation of identifying or recognizing the user's conversation style, emotion, and context by the sentiment identification module 851, 1151, or 1451 is described below.

Figure 16A:
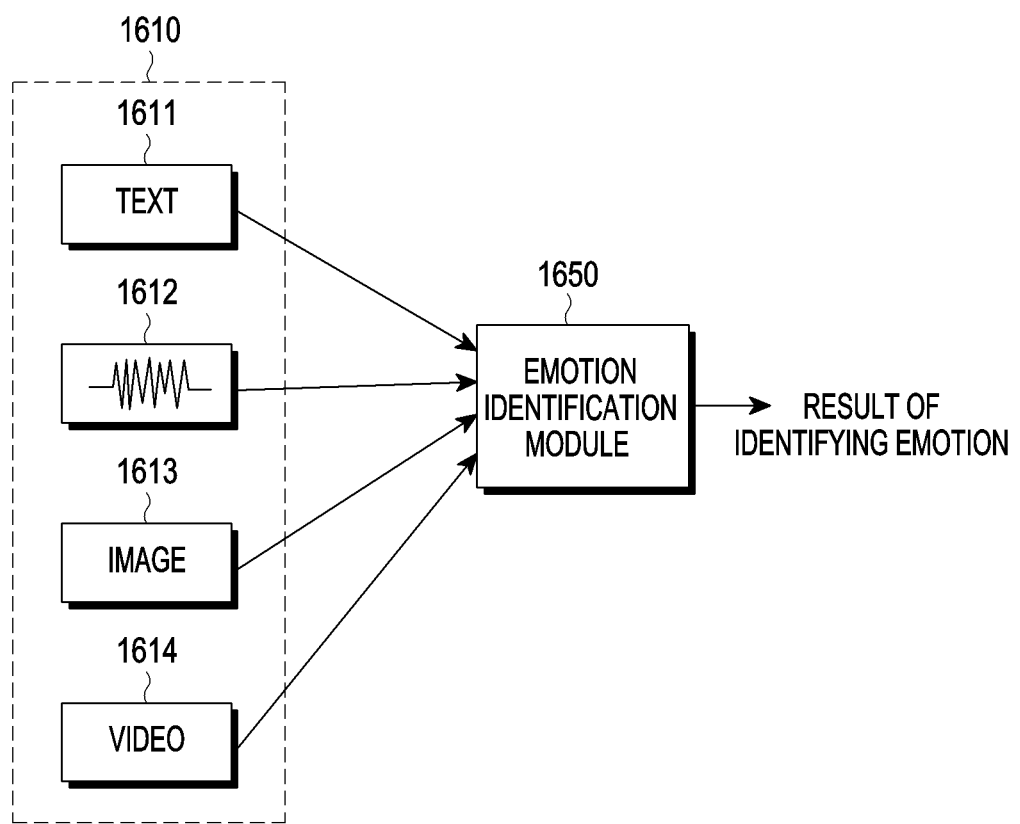
FIGS. 16A and 16B are views illustrating an operation of performing emotion recognition by a server according to an embodiment.
Figure 16B:
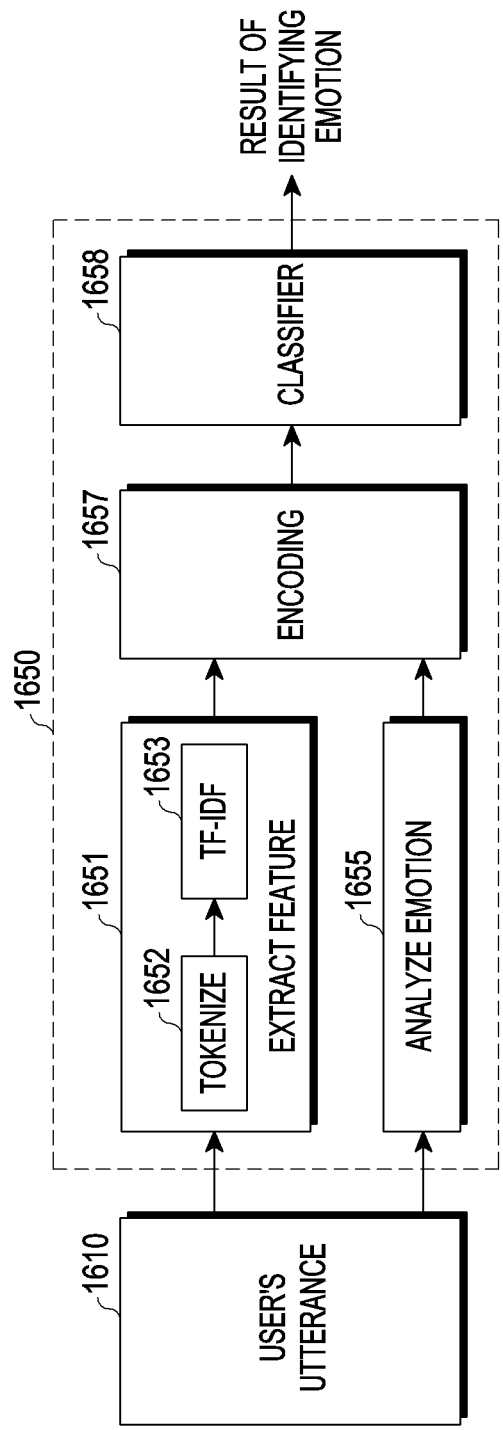

FIGS. 16A and 16B are views illustrating an operation of performing emotion recognition by a server according to an embodiment.

Referring to FIG. 16A, an emotion identification module 1650 may identify the user's emotion. For example, the emotion identification module 1650 may be included in the above-described sentiment identification module 851, 1151, or 1451.

According to an embodiment, the emotion identification module 1650 may identify the user's emotion based on information 1610 about the user's utterance.

According to an embodiment, the emotion identification module 1650 may analyze a text 1611 corresponding to the user's utterance. For example, the emotion identification module 1650 may identify what words are included in the user's utterance. The emotion identification module 1650 may identify whether a particular word indicating a particular emotion is included and the frequency of use. For example, when the use frequency of a particular word in the user's utterance is high, the emotion identification module 1650 may determine that the particular word indicates the user's emotion.

According to an embodiment, the emotion identification module 1650 may analyze a voice signal 1612 corresponding to the user's utterance. For example, the emotion identification module 1650 may analyze the voice signal 1612 and analyze the speed of voice (e.g., the speed of the user's utterance). For example, the emotion identification module 1650 may compare the speed of voice with a predetermined reference speed, thereby identifying whether the speed of voice is high or low. The emotion identification module 1650 may identify how fast the voice is based on a predetermined reference speed. For example, the emotion identification module 1650 may identify the user's emotion based on the speed of voice. For example, the emotion identification module 1650 may determine that the user is in a hurry when the speed of the user's voice is high. In contrast, the emotion identification module 1650 may determine that the user is relaxed when the speed of the user's voice is low.

The emotion identification module 1650 may analyze the frequency of the voice signal 1612. For example, the emotion identification module 1650 may identify a high-frequency portion and a low-frequency portion in the voice signal and identify where the speech is emphasized according to the amplitude or pitch of frequency. The emotion identification module 1650 may identify a word or text corresponding to the emphasized portion in the voice through the frequency signal and determine that the emotion corresponding to the word is the user's emotion.

The emotion identification module 1650 may identify an image 1613 and/or video 1614 related to the user's utterance. For example, when the content of the user's utterance is to request a particular photo, the emotion identification module 1650 may analyze the image 1613 corresponding to the particular photo. For example, the emotion identification module 1650 may analyze, e.g., the place where the image 1613 is generated, time, property, the location where the image is stored, and an object contained in the image and identify the user's emotion using a result of the analysis. Likewise, when the content of the utterance is to request a particular video, the emotion identification module 1650 may analyze a data file corresponding to the particular video. For example, the emotion identification module 1650 may analyze the property of the video or data file, content contained in the video, or the location where the video is stored and identify the user's emotion using a result of the analysis. The emotion identification module 1650 may output the result of identifying the user's emotion.

Referring to FIG. 16B, the emotion identification module 1650 may include a feature extracting unit 1651, an emotion analyzing unit 1655, an encoding unit 1657, and a classifier 1658.

According to an embodiment, the feature extracting unit 1651 may extract features from the user's utterance. For example, the feature extracting unit 1651 may tokenize the extracted features through a tokenizing unit 1652 and determine weights for the tokenized features. For example, a weight determining unit 1653 may determine the weights for the tokenized features using a term frequency-inverse document frequency (TF-IDF).

According to an embodiment, the emotion analyzing unit 1655 may perform emotion analysis on the user's utterance. For example, the emotion analyzing unit 1655 may perform emotion analysis on the user's utterance using a Valence Aware Dictionary and sEntiment Reasoner (VADER) library.

According to an embodiment, the encoding unit 1657 may encode the value output from the feature extracting unit 1651 and the value output from the emotion analyzing unit 1655 and output the encoded data to the classifier 1658.

According to an embodiment, the classifier 1658 may classify the user's emotions and determine the user's emotion according to the result of classification. For example, the classifier 1658 may use a support vector machines (SVM) model.

Figure 17:
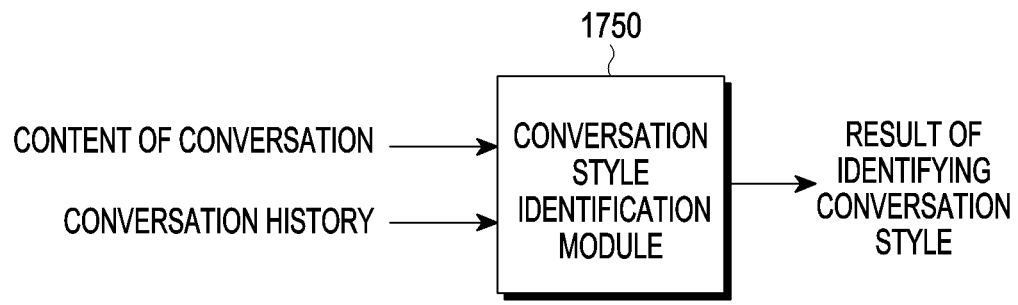
FIG. 17 is a view illustrating an operation of performing style recognition by a server according to an embodiment.

FIG. 17 is a view illustrating an operation of performing style recognition by a server according to an embodiment.

Referring to FIG. 17, a conversation style identification module 1750 may identify the user's conversation style. For example, the conversation style identification module 1750 may be included in the above-described sentiment identification module 851, 1151, or 1451.

According to an embodiment, the conversation style identification module 1750 may analyze at least one of conversation content and conversation history corresponding to the user's utterance. The conversation style identification module 1750 may also analyze the intonation of the user's utterance. For example, the conversation style identification module 1750 may analyze the content intended by the user's utterance and identify the user's conversation style. The conversation style identification module 1750 may analyze the conversation history corresponding to the user's utterance and identify the user's conversation style. For example, the conversation style identification module 1750 may analyze the presence or absence of an expression used among teenagers in the conversation content and identify or determine whether the user's conversation style is that of teenagers. The conversation style identification module 1750 may output the result of identifying the user's conversation style.

The operation of obtaining the result of recognizing the conversation style as described above in connection with FIG. 17 may be implemented in a similar manner to the operation of obtaining the result of recognizing an emotion as described above in connection with FIG. 16B.

Figure 18:
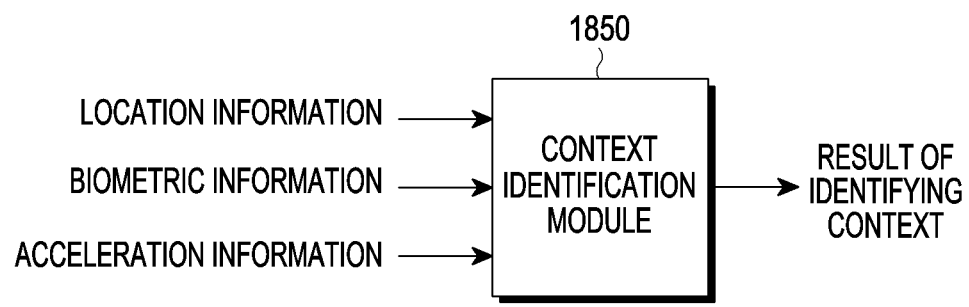
FIG. 18 is a view illustrating an operation of performing context recognition by a server according to an embodiment.

FIG. 18 is a view illustrating an operation of performing context recognition by a server according to an embodiment.

Referring to FIG. 18, a context identification module 1850 may identify the user's context. For example, the context identification module 1850 may be included in the above-described sentiment identification module 851, 1151, or 1451.

According to an embodiment, the context identification module 1850 may identify the user's context based on at least one of location information about the location of the user or a terminal corresponding to the user when the user's utterance is identified, the user's biometric information when the user's utterance is obtained, and acceleration information about the user or a terminal corresponding to the user when the user's utterance is obtained. For example, the context identification module 1850 may determine whether the context where the user's utterance is obtained is when the user is out, when the user is working, or when the user is at rest. For example, the context identification module 1850 may identify whether the user is at rest using biometric information (e.g., heartbeat) obtained through a sensor included in the electronic device (e.g., the user terminal 100 of FIG. 1). The context identification module 1850 may output the result of identifying the user's context.

The operation of obtaining the result of recognizing the context as described above in connection with FIG. 18 may be implemented in a similar manner to the operation of obtaining the result of recognizing an emotion as described above in connection with FIG. 16B.

FIGS. 19A, 19B, 19C, and 19D are views illustrating an operation of generating a response to a user's utterance by a server according to an embodiment.

Figure 19A:
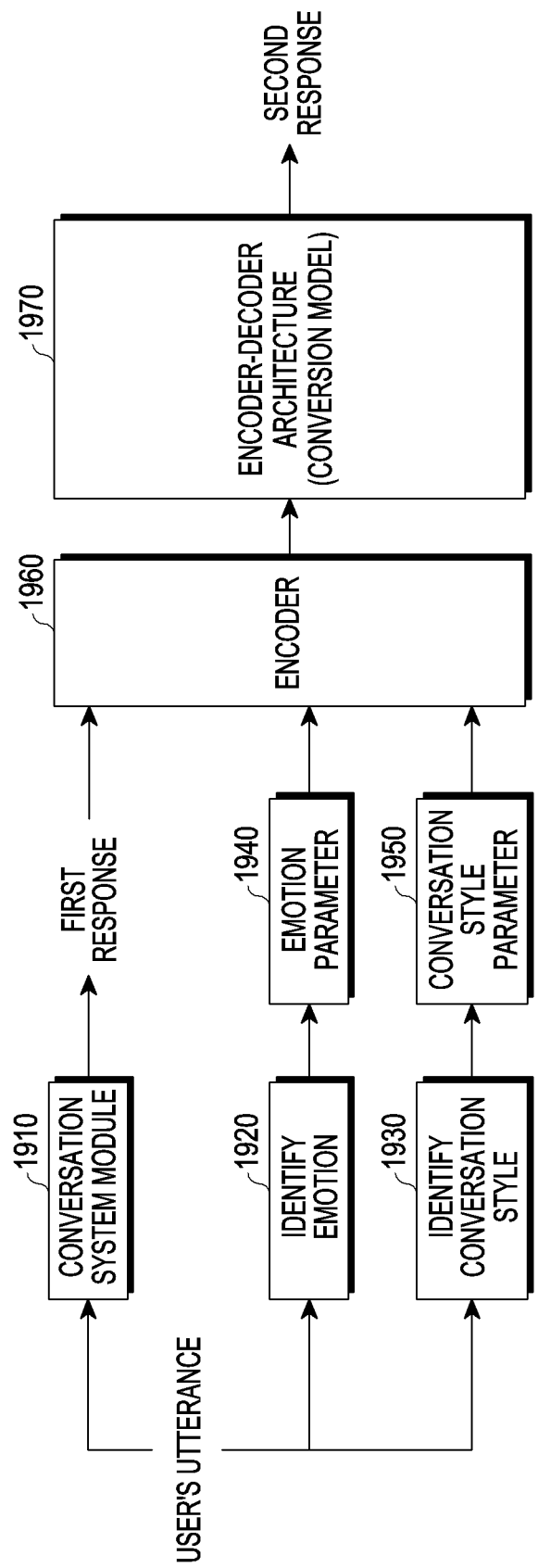

Referring to FIG. 19A, an external server (e.g., the intelligent server 200 of FIG. 1) may include a conversation system module 1910, an emotion identification module 1920, a conversation style identification module 1930, an emotion parameter module 1940, a conversation style parameter module 1950, an encoder 1960, and a conversion model (encoder-decoder architecture) 1970.

According to an embodiment, the conversation system module 1910 may analyze the user's utterance and generate and obtain a neutral first response. For example, the conversation system module 1910 may include at least one of the components 210 to 260 described above in connection with FIG. 4.

According to an embodiment, the emotion identification module 1920 may identify the user's emotion based on the user's utterance and output the result of the identification. The emotion parameter module 1940 may determine a first parameter corresponding to the user's emotion and output the first parameter value to the encoder 1960.

According to an embodiment, the conversation style identification module 1930 may identify the user's conversation style based on the user's utterance and output the result of the identification. The conversation style parameter module 1950 may determine a second parameter corresponding to the user's conversation style and output the second parameter to the encoder 1960.

According to an embodiment, the encoder 1960 may encode the first response, the first parameter value, and the second parameter value and output the encoded values to the conversion model 1970.

According to an embodiment, the conversion model 1970 may process the encoded values and generate the processed result, i.e., a second response reflecting the user's conversation style and emotion. For example, the conversion model 1970 may be implemented as an encoder-decoder architecture. The conversion model 1970 may be implemented as a sequence-to-sequence deep learning architecture. The conversion model 1970 may be implemented as a deep learning architecture in various forms.

According to an embodiment, the conversion model 1970 may set a code value about the relationship between the user's emotion and conversation style based on the first parameter value and the second parameter value. For example, referring to Table 1975 of FIG. 19B, the conversion model 1970 may set an X1 code for a combination of the emotion "happy" and the conversation style "friend," an X2 code for a combination of the emotion "cranky" and the conversation style "friend," a Y1 code for a combination of the emotion "happy" and the conversation style "teenager," and a Y2 code for a combination of the emotion "cranky" and the conversation style "teenager."

The conversion model 1970 may determine that the user's emotion is "happy" and the user's conversation style is "friend" based on the first parameter value and the second parameter value. For example, as shown in FIG. 19C, the conversion model 1970 may add the X1 code before (or behind) the text of the neutral first response. The conversion model 1970 may add a sentence or text corresponding to the X1 code to the first response, thereby generating or obtaining a second response. When the first response is "It is 25° C." as shown in FIG. 19D, the conversion model 1970 may generate a second response including the text "Hi. It's 25° C. Isn't it too hot?" which adds the text corresponding to the X1 code.

Although FIG. 19A illustrates a configuration of identifying the result of identifying the user's context for illustration purposes, the technical spirit of the disclosure is not limited thereto. For example, the external server 200 may identify the user's context and set the parameter corresponding to the user's context as an input value to the encoder. Therefore, the external server 200 may generate or obtain a second response based on an emotion parameter, a conversation style parameter, and a context parameter.

Figure 20:
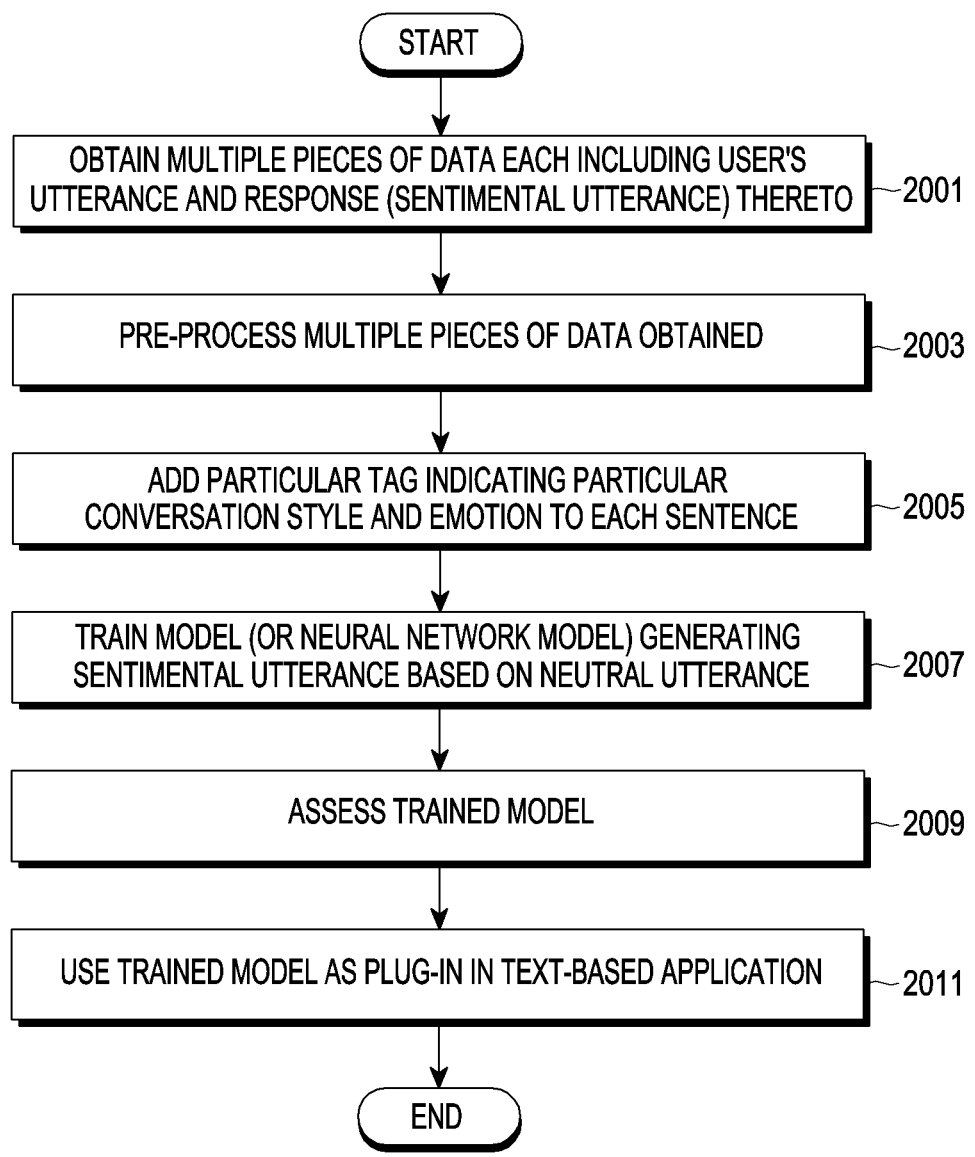
FIG. 20 is a view illustrating an operation of training a variation model by a server according to an embodiment.

FIG. 20 is a view illustrating an operation of training a variation model by a server according to an embodiment.

Referring to FIG. 20, an external server (e.g., the intelligent server 200 of FIG. 1) may obtain a plurality of pieces of data each of which contains the user's utterance and a response thereto (sentiment utterance) in operation 2001. For example, when the user says particular words, a plurality of pieces of data as to what response another party might say may be obtained or gathered.

In operation 2003, the external server 200 may preprocess the plurality of pieces of data. For example, the external server 200 may organize the plurality of pieces of data and generate a table as shown in FIG. 19B.

In operation 2005, the external server 200 may add a particular tag or particular code indicating a particular conversation style and emotion to each of sentences corresponding to the neutral response to the user's utterance using the table as shown in FIG. 19B.

In operation 2007, the external server 200 may train a model or neural network model generating a sentiment utterance based on the neutral utterance.

In operation 2009, the user or a checking device may assess the trained model. For example, the user or checking device may assess the reliability or accuracy of the trained model.

In operation 2011, the external server 200 may use the trained model as a text-based application plug-in. For example, the external server 200 may use the trained model in the conversion model of FIG. 19A.

Figure 21:
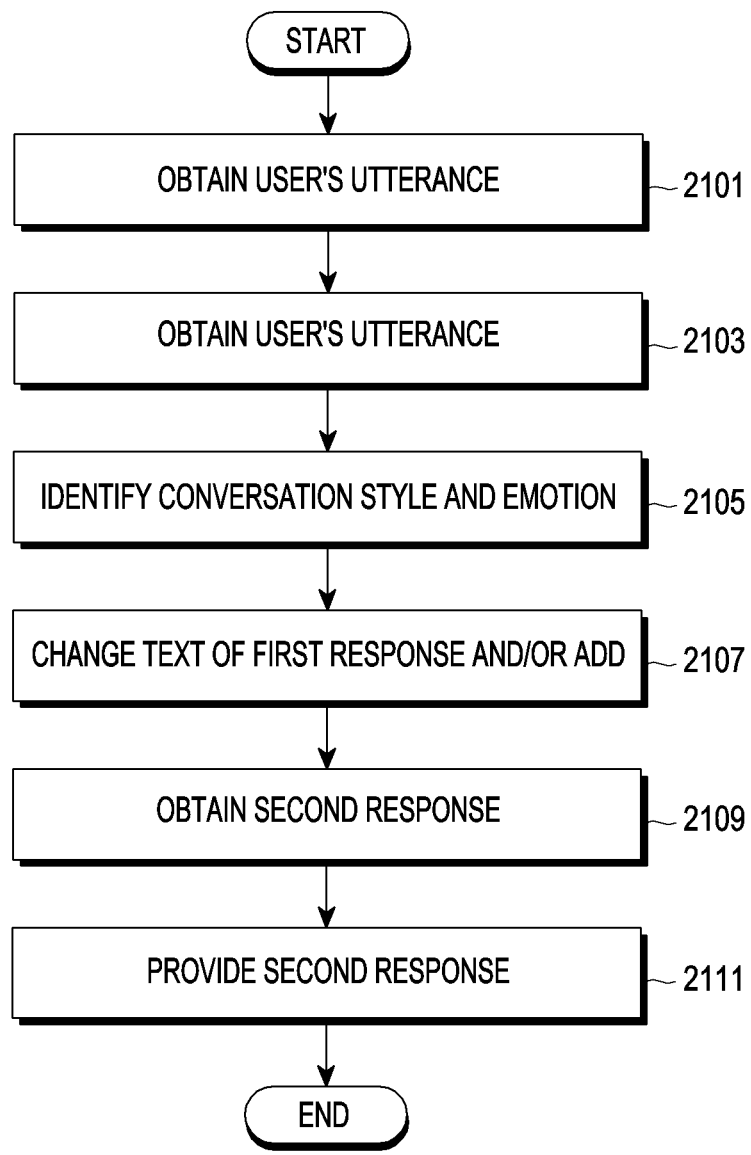
FIG. 21 is a flowchart illustrating operations of an electronic device according to an embodiment.

FIG. 21 is a flowchart illustrating operations of an electronic device according to an embodiment.

According to an embodiment, the above-described operation of identifying the user's conversation style and emotion based on the user's utterance and the operation of obtaining a sentimental response to the user's utterance based on the user's conversation style and/or emotion may also be carried out by the electronic device 100. For example, the above-described conversion system module 850 or 1150 may be included in the electronic device 100. In other words, the electronic device 100 may perform the operation of identifying the user's conversation style and emotion based on the user's utterance and the operation of obtaining a sentimental response to the user's utterance based on the user's conversation style and/or emotion. It is described below with reference to FIG. 21 that the operation of identifying the user's conversation style and emotion based on the user's utterance and the operation of obtaining a sentimental response to the user's utterance based on the user's conversation style and/or emotion may be performed by the electronic device 100.

Referring to FIG. 21, the electronic device 100 may obtain the user's utterance through a microphone in operation 2101.

In operation 2103, the electronic device 100 may obtain a neutral first response to the user's utterance based on the user's utterance or information about the user's utterance. For example, the electronic device 100 may identify the meaning of the user's utterance by performing ASR and/or NLU and obtain a first response appropriate for the user's utterance. For example, the first response may include a text of neutral content.

In operation 2105, the electronic device 100 may identify the user's conversation style and emotion based on information about the user's utterance. For example, the electronic device 100 may identify the user's emotion based on, e.g., a text, voice, or video or image for the user's utterance and identify the user's conversation style based on, e.g., the content, intonation, or conversation history of the user's utterances.

In operation 2107, the electronic device 100 may change the text contained in the first response and/or add based on the user's conversation style and/or emotion. For example, the electronic device 100 may adjust, change and/or add the text contained in the first response considering the user's conversation style and/or emotion.

In operation 2109, the electronic device 100 may adjust the text contained in the first response considering the user's conversation style and/or emotion, thereby obtaining a second response.

In operation 2111, the electronic device 100 may provide the second response to the user's utterance. For example, the electronic device 100 may provide the second response as a voice through the speaker. The electronic device 100 may provide the second response as a message through the display.

Figure 22:
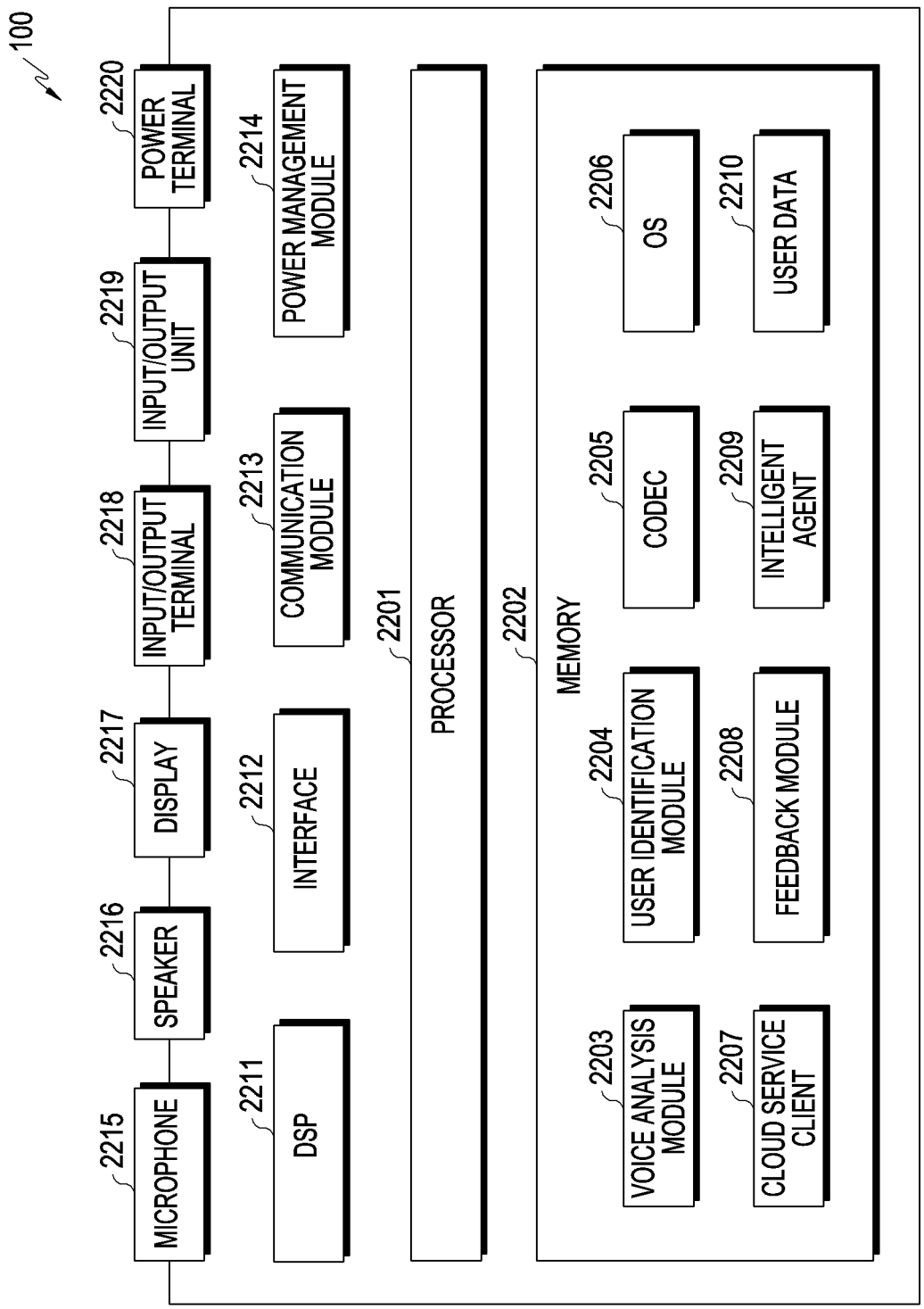
FIG. 22 is a block diagram illustrating a detailed configuration of an electronic device according to an embodiment.

FIG. 22 is a block diagram illustrating a detailed configuration of an electronic device according to an embodiment.

The electronic device 100 may include a processor 2201, a memory 2202, a microphone 2215, a speaker 2216, a display 2217, an input/output terminal or port 2218, an input/output unit 2219, a power terminal 2220, a digital signal processor (DSP) 2211, an interface 2212, a communication module 2213 and a power management module 2214.

The processor 2201 may control various components of the electronic device 100 to perform any operation.

The memory 2202 may include a voice analysis module 2203, a user identification module 2204, a codec 2205, an operating system (OS) 2206, a cloud service client 2207, a feedback module 2208, an intelligent agent 2209, or user data 2210. According to an embodiment, the memory 2202 may store software to drive the electronic device 100, data necessary to drive the software, and user data. The software may include at least one of an operating system (OS), a framework, or an application program. The data necessary to drive the software may include at least one of temporary data temporarily generated and used while the software is driven or program data generated and stored by the driving of the software. The user data may be various forms of content generated or obtained by the user. For example, the user data may include at least one of music, a video, a photo, or a document.

The voice analysis module 2203 may obtain and analyze the user's utterance. The analysis may include at least one of obtaining a voice pattern from the utterance, storing the obtained voice pattern as an authentication voice pattern, or comparing the stored authentication voice pattern and the utterance voice pattern. The analysis may include at least one function of extracting text (speech-to-text (STT)) from the utterance or natural language processing or may include the function of identifying the result of performing at least one function.

The user identification module 2204 may manage the user's account by which the electronic device 100 and a service associated with the electronic device 100 may be used. The user identification module 2204 may store the user account and relevant information for authenticating the user account. The user identification module 2204 may refer to at least one of various authentication methods, such as identity (ID)/password, device authentication, or voice pattern authentication, thereby performing an authentication process on the user who desires to use the electronic device.

The codec 2205 may compress and store image or voice data (coder, encoding) or decompress compressed image or voice data to be output as an analog signal (decoder, decoding). The codec 2205 may be stored in the memory 2202 in the form of software and be driven by the processor 2201. The codec 2205 may be stored in a digital signal processor (DSP) 211 in the form of firmware and be driven. The codec 2205 may include at least one of MPEG, Indeo, DivX, Xvid, H.264, WMV, RM, MOV, ASF, RA, or other video codecs or MP3, AC3, AAC, OGG, WMA, FLAC, DTS, or other audio codecs.

The OS 2206 may provide basic functions to operate the electronic device 100 and control the overall operation state. The OS 2206 may detect various events and enable operations corresponding to the events to be performed. The OS 2206 may provide a third application program installation and driving environment to perform extended functions.

The cloud service client 2207 may enable a performing of connection between the electronic device 100 and the server 200 and related operations. The cloud service client 2207 may perform the function of synchronizing data stored in the electronic device 100 with data stored in the server 200. The cloud service client 2207 may receive a cloud service from the server 200. The cloud service may be various forms of external third-party services including, e.g., data storage or content streaming.

The feedback module 2208 may generate or produce a feedback to be provided from the electronic device 100 to the user of the electronic device 100. The feedback may include at least one of sound feedback, light emitting diode (LED) feedback, vibration feedback, or a method of controlling part of the device.

The intelligent agent 2209 may perform an intelligent function based on the user's utterance obtained through the electronic device 100 or obtain a result of performing the intelligent function in association with an external intelligent service. The intelligent function may include at least one of ASR, STT, NLU, NLG, TTS, action planning, or reasoning to recognize and process the user's utterance. According to an embodiment, the intelligent agent 2209 may recognize the user's utterance obtained through the electronic device 100 and obtain a neutral response to the user's utterance based on the text extracted from the recognized utterance. The intelligent agent 2209 may identify the user's conversation style and/or emotion, thereby changing or adjusting the neutral response into a sentimental response. The intelligent agent 2209 may output the sentimental response through the speaker 2216. The user data 2210 may be data generated and obtained by the user or data generated or obtained by a function performed by the user.

The digital signal processor (DSP) 2211 may convert an analog image or analog voice signal into a digital signal processible by the electronic device or convert a stored digital image or digital voice signal into an analog signal recognizable by the user and output the resultant signal. The DSP 2211 may implement computation necessary for the operation in the form of circuitry to perform the operation at high speed. The DSP 2211 may include the codec 2205 or refer to the codec 2205 to perform operations.

The interface 2212 may enable the electronic device 100 to perform the function of obtaining an input from the user, output information for the user, or exchange information with an external electronic device. Specifically, the interface 2212 may be functionally and operatively connected with the microphone 2215 or the speaker 2216 for sound signal processing. As another example, the interface 2212 may be functionally and operatively connected with the display 2217 to output information to the user. The interface 2212 may be functionally and operatively connected with the input/output terminal 2218 and the input/output unit 2219 to perform input/output operations between the user or external electronic device and the electronic device 100 in various forms.

The communication module (e.g., a network unit) 2213 may enable the electronic device 100 to exchange information with an external device using a networking protocol. The networking protocol may include at least one of near-field communication (NFC), Bluetooth/Bluetooth low energy (BLE), Zigbee, Z-wave or other short-range communication protocols, transmission control protocol (TCP), user datagram protocol (UDP), or other Internet (network) protocols. The communication module 2213 may support at least one of wired communication networks or wireless communication networks.

The power management unit 2214 may obtain power to drive the electronic device 100 from the power terminal 2220 and control it to supply power to drive the electronic device 100. The power management module 2214 may charge a battery with the power obtained from the power terminal 2220. The power management module 2214 may perform at least one of changing the voltage of the power obtained to charge or drive the electronic device 100, changing direct current (DC) and alternate current (AC), current control, or current circuit control.

The microphone (MIC) 2215 may obtain a sound signal from the user or ambient environment. The speaker 2216 may output the sound signal. The display 2217 may output an image signal.

The input/output terminal (or port) 2218 may provide a means for connection with an external electronic device to expand the functionality of the electronic device 100. The input/output terminal 2218 may include at least one of an audio input terminal, an audio output terminal, a universal serial bus (USB) extension port, or LAN port.

The input/output unit 2219 may include various devices to obtain input from the user and output information to the user. The input/output unit 2219 may include at least one of a button, a touch panel, a wheel, a jog dial, a sensor, an LED, a vibrator, or a beeper. The power terminal 2220 may receive AC/DC power to drive the electronic device 100.

Figure 23:
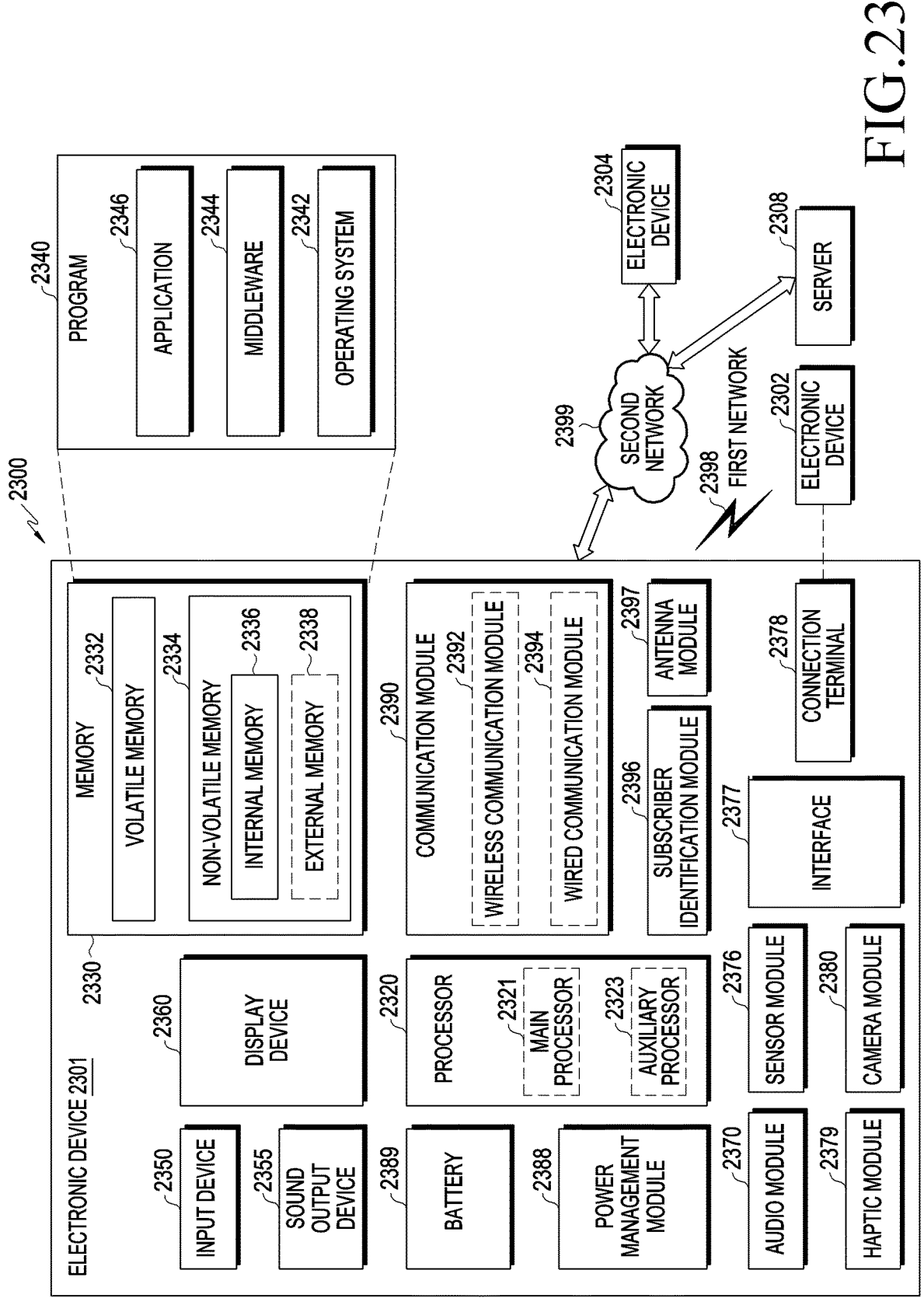
FIG. 23 is a block diagram illustrating an electronic device in a network environment according to an embodiment.

FIG. 23 is a block diagram illustrating an electronic device in a network environment according to an embodiment.

FIG. 23 is a block diagram illustrating an electronic device 2301 in a network environment 2300 according to various embodiments. Referring to FIG. 23, the electronic device 2301 (e.g., the user terminal 100 of FIG. 1 and/or the electronic device 100 of FIGS. 6 to 20) in the network environment 2300 may communicate with an electronic device 2302 via a first network 2398 (e.g., a short-range wireless communication network), or an electronic device 2304 or a server 2308 (e.g., the intelligent server 200 of FIG. 1 and/or the external server 200 of FIGS. 6 to 20) via a second network 2399 (e.g., a long-range wireless communication network). According to an embodiment, the electronic device 2301 may communicate with the electronic device 2304 via the server 2308. According to an embodiment, the electronic device 2301 may include a processor 2320, a memory 2330, an input device 2350, a sound output device 2355, a display device 2360, an audio module 2370, a sensor module 2376, an interface 2377, a connection terminal 2378, a haptic module 2379, a camera module 2380, a power management module 2388, a battery 2389, a communication module 2390, a subscriber identification module (SIM) 2396, or an antenna module 2397. In some embodiments, at least one (e.g., the display device 2360 or the camera module 2380) of the components may be omitted from the electronic device 2301, or one or more other components may be added in the electronic device 101. In some embodiments, some of the components may be implemented as single integrated circuitry. For example, the sensor module 2376 (e.g., a fingerprint sensor, an iris sensor, or an illuminance sensor) may be implemented as embedded in the display device 2360 (e.g., a display).

The processor 2320 may execute, e.g., software (e.g., a program 2340) to control at least one other component (e.g., a hardware or software component) of the electronic device 2301 connected with the processor 2320 and may process or compute various data. According to one embodiment, as at least part of the data processing or computation, the processor 2320 may load a command or data received from another component (e.g., the sensor module 2376 or the communication module 2390) in volatile memory 2332, process the command or the data stored in the volatile memory 2332, and store resulting data in non-volatile memory 2334. According to an embodiment, the processor 2320 may include a main processor 2321 (e.g., a central processing unit (CPU) or an application processor (AP)), and an auxiliary processor 2323 (e.g., a graphics processing unit (GPU), an image signal processor (ISP), a sensor hub processor, or a communication processor (CP)) that is operable independently from, or in conjunction with, the main processor 121. Additionally or alternatively, the auxiliary processor 2323 may be adapted to consume less power than the main processor 2321, or to be specific to a specified function. The auxiliary processor 2323 may be implemented as separate from, or as part of the main processor 2321.

The auxiliary processor 2323 may control at least some of functions or states related to at least one (e.g., the display device 2360, the sensor module 2376, or the communication module 2390) of the components of the electronic device 2301, instead of the main processor 2321 while the main processor 2321 is in an inactive (e.g., sleep) state or along with the main processor 2321 while the main processor 2321 is an active state (e.g., executing an application). According to an embodiment, the auxiliary processor 2323 (e.g., an image signal processor or a communication processor) may be implemented as part of another component (e.g., the camera module 2380 or the communication module 2390) functionally related to the auxiliary processor 123.

The memory 2330 may store various data used by at least one component (e.g., the processor 2320 or the sensor module 2376) of the electronic device 2301. The various data may include, for example, software (e.g., the program 2340) and input data or output data for a command related thereto. The memory 2330 may include the volatile memory 2332 or the non-volatile memory 2334.

The program 2340 may be stored in the memory 2330 as software, and may include, for example, an operating system (OS) 2342, middleware 2344, or an application 2346.

The input device 2350 may receive a command or data to be used by other component (e.g., the processor 2320) of the electronic device 2301, from the outside (e.g., a user) of the electronic device 2301. The input device 2350 may include, for example, a microphone, a mouse, a keyboard, or a digital pen (e.g., a stylus pen).

The sound output device 2355 may output sound signals to the outside of the electronic device 2301. The sound output device 2355 may include, for example, a speaker or a receiver. The speaker may be used for general purposes, such as playing multimedia or playing record, and the receiver may be used for an incoming calls. According to an embodiment, the receiver may be implemented as separate from, or as part of the speaker.

The display device 2360 may visually provide information to the outside (e.g., a user) of the electronic device 2301. The display device 2360 may include, for example, a display, a hologram device, or a projector and control circuitry to control a corresponding one of the display, hologram device, and projector. According to an embodiment, the display device 2360 may include touch circuitry adapted to detect a touch, or sensor circuitry (e.g., a pressure sensor) adapted to measure the intensity of force incurred by the touch.

The audio module 2370 may convert a sound into an electrical signal and vice versa. According to an embodiment, the audio module 2370 may obtain a sound through the input device 2350 or output a sound through the sound output device 2355 or an external electronic device (e.g., an electronic device 2302 (e.g., a speaker or a headphone) directly or wirelessly connected with the electronic device 2301.

The sensor module 2376 may detect an operational state (e.g., power or temperature) of the electronic device 2301 or an environmental state (e.g., a state of a user) external to the electronic device 2301, and then generate an electrical signal or data value corresponding to the detected state. According to an embodiment, the sensor module 2376 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 2377 may support one or more specified protocols to be used for the electronic device 2301 to be coupled with the external electronic device (e.g., the electronic device 2302) directly (e.g., wiredly) or wirelessly. According to an embodiment, the interface 2377 may include, for example, a high definition multimedia interface (HDMI), a universal serial bus (USB) interface, a secure digital (SD) card interface, or an audio interface.

The connecting terminal 2378 may include a connector via which the electronic device 2301 may be physically connected with the external electronic device (e.g., the electronic device 2302). According to an embodiment, the connecting terminal 2378 may include, for example, a HDMI connector, a USB connector, a SD card connector, or an audio connector (e.g., a headphone connector).

The haptic module 2379 may convert an electrical signal into a mechanical stimulus (e.g., a vibration or motion) or electrical stimulus which may be recognized by a user via his tactile sensation or kinesthetic sensation. According to an embodiment, the haptic module 2379 may include, for example, a motor, a piezoelectric element, or an electric stimulator.

The camera module 2380 may capture a still image or moving images. According to an embodiment, the camera module 2380 may include one or more lenses, image sensors, image signal processors, or flashes.

The power management module 2388 may manage power supplied to the electronic device 2301. According to one embodiment, the power management module 188 may be implemented as at least part of, for example, a power management integrated circuit (PMIC).

The battery 2389 may supply power to at least one component of the electronic device 2301. According to an embodiment, the battery 2389 may include, for example, a primary cell which is not rechargeable, a secondary cell which is rechargeable, or a fuel cell.

The communication module 2390 may support establishing a direct (e.g., wired) communication channel or wireless communication channel between the electronic device 2301 and an external electronic device (e.g., the electronic device 2302, the electronic device 2304, or the server 2308) and performing communication through the established communication channel. The communication module 2390 may include one or more communication processors that are operable independently from the processor 2320 (e.g., the application processor (AP)) and supports a direct (e.g., wired) communication or a wireless communication. According to an embodiment, the communication module 2390 may include a wireless communication module 2392 (e.g., a cellular communication module, a short-range wireless communication module, or a global navigation satellite system (GNSS) communication module) or a wired communication module 2394 (e.g., a local area network (LAN) communication module or a power line communication (PLC) module). A corresponding one of these communication modules may communicate with the external electronic device via the first network 2398 (e.g., a short-range communication network, such as Bluetooth™, wireless-fidelity (Wi-Fi) direct, or infrared data association (IrDA)) or the second network 2399 (e.g., a long-range communication network, such as a cellular network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 2392 may identify and authenticate the electronic device 2301 in a communication network, such as the first network 2398 or the second network 2399, using subscriber information (e.g., international mobile subscriber identity (IMSI)) stored in the subscriber identification module 2396.

The antenna module 2397 may transmit or receive a signal or power to or from the outside (e.g., the external electronic device) of the electronic device 2301. According to an embodiment, the antenna module may include one antenna including a radiator formed of a conductor or conductive pattern formed on a substrate (e.g., a printed circuit board (PCB)). According to an embodiment, the antenna module 2397 may include a plurality of antennas. In this case, at least one antenna appropriate for a communication scheme used in a communication network, such as the first network 2398 or the second network 2399, may be selected from the plurality of antennas by, e.g., the communication module 2390. The signal or the power may then be transmitted or received between the communication module 2390 and the external electronic device via the selected at least one antenna. According to an embodiment, other parts (e.g., radio frequency integrated circuit (RFIC)) than the radiator may be further formed as part of the antenna module 2397.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 2301 and the external electronic device 2304 via the server 2308 coupled with the second network 2399. The first and second external electronic devices 2302 and 2304 each may be a device of the same or a different type from the electronic device 2301. According to an embodiment, all or some of operations to be executed at the electronic device 2301 may be executed at one or more of the external electronic devices 2302, 2304, or 2308. For example, if the electronic device 2301 should perform a function or a service automatically, or in response to a request from a user or another device, the electronic device 2301, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 2301. The electronic device 2301 may provide the outcome, with or without further processing of the outcome, as at least part of a reply to the request. To that end, a cloud computing, distributed computing, or client-server computing technique may be used, for example.

According to an embodiment, an electronic device comprises a microphone, a communication circuit, and a processor configured to obtain a user's utterance through the microphone, transmit first information about the utterance through the communication circuit to an external server for at least partially automatic speech recognition (ASR) or natural language understanding (NLU), obtain a second text from the external server through the communication circuit, the second text being a text resulting from modifying at least part of a first text included in a neutral response to the utterance based on parameters corresponding to the user's conversation style and emotion identified based on the first information, and provide a voice corresponding to the second text or a message including the second text in response to the utterance.

A parameter for the user's emotion may be identified based on at least one of a text, voice, sound volume, image, or video for the utterance.

A parameter for the user's conversation style may be identified based on at least one of a content of the utterance, intonation of the utterance or a conversation history related to the utterance.

The second text may include a text resulting from further modifying the at least part of the first text based on a parameter which is based on at least one of the user's biometric information, a location of a terminal corresponding to the user, or acceleration information about the terminal.

The second text may further include a new text corresponding to the conversation style and the emotion.

The processor may be configured to obtain a third text displayed on a display of the electronic device, transmit, through the communication circuit, second information about the third text to the external server to recognize the third text, obtain a fifth text from the external server through the communication circuit, the fifth text being a text resulting from modifying at least part of a fourth text included in a neutral response to the third text based on parameters corresponding to the user's conversation style and emotion identified based on the second information, and provide a voice corresponding to the fifth text or a message including the fifth text in response to the third text.

A parameter for the user's emotion may be identified based on at least one of at least one text included in the third text, an image related to the third text or video related to the third text.

A parameter for the user's conversation style may be identified based on at least one of a content of the third text or a conversation history related to the third text.

The conversation style and the emotion may be selected from among a plurality of predetermined conversation styles and emotions.

The processor may be configured to provide a voice corresponding to the second text or message including the second text while performing a function corresponding to the user's utterance.

According to an embodiment, a method for operating an electronic device comprises obtaining a user's utterance through a microphone of the electronic device, transmitting first information about the utterance through a communication circuit of the electronic device to an external server for at least partially ASR or NLU, obtaining a second text from the external server through the communication circuit, the second text being a text resulting from modifying at least part of a first text included in a neutral response to the utterance based on parameters corresponding to the user's conversation style and emotion identified based on the first information, and providing a voice corresponding to the second message or a message including the second text in response to the utterance.

A parameter for the user's emotion may be determined based on at least one of a text, voice, sound volume, image, or video for the utterance.

A parameter for the user's conversation style may be identified based on at least one of a content of the utterance, intonation of the utterance or a conversation history related to the utterance.

The second text may include a text resulting from further modifying the at least part of the first text based on a parameter which is based on at least one of the user's biometric information, a location of a terminal corresponding to the user, or acceleration information about the terminal.

The second text may further include a new text corresponding to the conversation style and the emotion.

The method of operating the electronic device may further comprise obtaining a third text displayed on a display of the electronic device, transmitting, through the communication circuit, second information about the third text to the external server to recognize the third text, obtaining a fifth text from the external server through the communication circuit, the fifth text being a text resulting from modifying at least part of a fourth text included in a neutral response to the third text based on parameters corresponding to the user's conversation style and emotion identified based on the second information, and providing a voice corresponding to the fifth text or a message including the fifth text in response to the third text.

A parameter for the user's emotion may be identified based on at least one of at least one text included in the third text, an image related to the third text or video related to the third text.

A parameter for the user's conversation style may be identified based on at least one of a content of the third text or a conversation history related to the third text.

The conversation style and the emotion may be selected from among a plurality of predetermined conversation styles and emotions.

According to an embodiment, an electronic device comprises a microphone and a processor configured to obtain a user's utterance through the microphone, obtain a neutral first response to the utterance by at least partially performing ASR or NLU, identify information about the user's conversation style and emotion based on the utterance, obtain a second response including a second text resulting from modifying at least part of a first text included in the first response based on the identified information, and provide the second response through a voice or a message in response to the utterance.

The second text may further include a new text corresponding to the conversation style and the emotion.

According to an embodiment, a device comprises a communication circuit and a processor configured to receive first information about a user's utterance from an electronic device through the communication circuit, obtain a neutral first response based on the first information, identify the user's conversation style and emotion based on the first information, change at least part of a text contained in the first response or add a new text to the text contained in the first response based on the user's conversation style and emotion, obtain a second response corresponding to the first response based on the changed or added text, and transmit the second response to the electronic device through the communication circuit.

According to an embodiment, there may be provided a computer-readable recording medium that may store a program to execute obtaining a user's utterance through a microphone of an electronic device, transmitting first information about the utterance through a communication circuit of the electronic device to an external server for at least partially ASR and/or NLU, obtaining a second text from the external server through the communication circuit, the second text being a text resulting from modifying at least part of a first text included in a neutral response to the utterance based on parameters corresponding to the user's conversation style and emotion identified based on the first information, and providing a voice and/or a message including the second text in response to the utterance.

Each of the aforementioned components of the electronic device may include one or more parts, and a name of the part may vary with a type of the electronic device. The electronic device in accordance with various embodiments of the disclosure may include at least one of the aforementioned components, omit some of them, or include other additional component(s). Some of the components may be combined into an entity, but the entity may perform the same functions as the components may do.

As is apparent from the foregoing description, according to various embodiments, an electronic device may provide a response containing text appropriate for the user's context in response to the user's utterance.

The embodiments disclosed herein are proposed for description and understanding of the disclosed technology and does not limit the scope of the disclosure. Accordingly, the scope of the disclosure should be interpreted as including all changes or various embodiments based on the technical spirit of the disclosure.

What is claimed is:

1. An electronic device, comprising:
a microphone;
a communication circuit; and
a processor configured to:
obtain an utterance of a user through the microphone,
transmit first information about the utterance through the communication circuit to an external server for automatic speech recognition (ASR) and natural language understanding (NLU),
obtain a second text from the external server through the communication circuit, wherein a neutral response for the first information and the second text are generated sequentially, wherein the neutral response is generated based on content of the utterance which is recognized based on the first information by performing the ASR and the NLU, and wherein the second text is a text resulting from modifying at least part of a first text included in the neutral response corresponding to the utterance based on parameters corresponding to a conversation style of the user and an emotion of the user that are identified based on the first information, and provide a voice corresponding to the second text or a message including the second text in response to the utterance while performing a function corresponding to the utterance.

2. The electronic device of claim 1, wherein a parameter for the emotion of the user is identified based on at least one of a text, voice, sound volume, image, or video for the utterance.

3. The electronic device of claim 1, wherein a parameter for the conversation style of the user is identified based on at least one of a content of the utterance, intonation of the utterance or a conversation history related to the utterance.

4. The electronic device of claim 1, wherein the second text includes a text resulting from further modifying the at least part of the first text based on a parameter which is based on at least one of biometric information of the user, a location of a terminal corresponding to the user, or acceleration information about the terminal.

5. The electronic device of claim 1, wherein the second text further includes a new text corresponding to the conversation style and the emotion.

6. The electronic device of claim 1, wherein the processor is configured to:

obtain a third text displayed on a display of the electronic device, transmit, through the communication circuit, second information about the third text to the external server to recognize the third text, obtain a fifth text from the external server through the communication circuit, the fifth text being a text resulting from modifying at least part of a fourth text included in a neutral response to the third text based on parameters corresponding to the conversation style of the user and the emotion of the user that are identified based on the second information, and provide a voice corresponding to the fifth text or a message including the fifth text in response to the third text.

7. The electronic device of claim 6, wherein a parameter for the emotion of the user is identified based on at least one of at least one text included in the third text, an image related to the third text or video related to the third text.

8. The electronic device of claim 6, wherein a parameter for the conversation style of the user is identified based on at least one of a content of the third text or a conversation history related to the third text.

9. The electronic device of claim 1, wherein the conversation style and the emotion are selected from among a plurality of predetermined conversation styles and emotions.

10. A method for operating an electronic device, the method comprising:

obtaining an utterance of a user through a microphone of the electronic device;

transmitting first information about the utterance through a communication circuit of the electronic device to an external server for ASR and NLU;

obtaining a second text from the external server through the communication circuit, wherein a neutral response for the first information and the second text are generated sequentially, wherein the neutral response is generated based on content of the utterance which is recognized based on the first information by performing the ASR and the NLU, and wherein the second text is a text resulting from modifying at least part of a first text included in the neutral response corresponding to the utterance based on parameters corresponding to a conversation style of the user and an emotion of the user that are identified based on the first information; and providing a voice corresponding to the second text or a message including the second text in response to the utterance while performing a function corresponding to the utterance.

11. The method of claim 10, wherein a parameter for the emotion of the user is identified based on at least one of a text, voice, sound volume, image, or video for the utterance.

12. The method of claim 10, wherein a parameter for the conversation style of the user is identified based on at least one of a content of the utterance, intonation of the utterance or a conversation history related to the utterance.

13. The method of claim 10, wherein the second text includes a text resulting from further modifying the at least part of the first text based on a parameter which is based on at least one of biometric information of the user, a location of a terminal corresponding to the user, or acceleration information about the terminal.

14. The method of claim 10, wherein the second text further includes a new text corresponding to the conversation style and the emotion.

15. The method of claim 10, further comprising:

obtaining a third text displayed on a display of the electronic device;

transmitting, through the communication circuit, second information about the third text to the external server to recognize the third text;

obtaining a fifth text from the external server through the communication circuit, the fifth text being a text resulting from modifying at least part of a fourth text included in a neutral response to the third text based on parameters corresponding to the conversation style of the user and the emotion of the user that are identified based on the second information; and providing a voice corresponding to the fifth text or a message including the fifth text in response to the third text.

16. The method of claim 15, wherein a parameter for the emotion of the user is identified based on at least one of at least one text included in the third text, an image related to the third text or video related to the third text.

17. The method of claim 15, wherein a parameter for the conversation style of the user is identified based on at least one of a content of the third text or a conversation history related to the third text.

18. An electronic device, comprising:

a microphone; and a processor configured to:

obtain an utterance of a user through the microphone, obtain a neutral first response corresponding to the utterance by performing ASR and NLU, identify information about a conversation style of the user and an emotion of the user based on the utterance, obtain a second response including a second text resulting from modifying at least part of a first text included in the neutral first response based on the identified information, wherein the neutral first response and the second response are generated sequentially, and wherein the neutral first response is generated based on content of the utterance which is recognized by performing the ASR and the NLU, and provide the second response through a voice or a message in response to the utterance while performing a function corresponding to the utterance.

19. The electronic device of claim 18, wherein the second text further includes a new text corresponding to the conversation style and the emotion.

* * * * *